(12) United States Patent
Tsunoda

(10) Patent No.: US 7,508,374 B2
(45) Date of Patent: Mar. 24, 2009

(54) ELECTRONIC APPLIANCE HAVING MAGNIFYING-GLASS DISPLAY FUNCTION, DISPLAY CONTROLLING METHOD, AND DISPLAY CONTROL PROGRAM

(75) Inventor: Akihiro Tsunoda, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 900 days.

(21) Appl. No.: 10/863,768

(22) Filed: Jun. 7, 2004

(65) Prior Publication Data

US 2005/0001815 A1    Jan. 6, 2005

(30) Foreign Application Priority Data

Jun. 9, 2003    (JP)    ............... 2003-163666
Apr. 16, 2004    (JP)    ............... 2004-121664

(51) Int. Cl.
*G06F 3/033*    (2006.01)

(52) U.S. Cl. ............... 345/158; 345/169; 345/472.2

(58) Field of Classification Search ............... 345/158, 345/173, 670, 671, 698, 169, 472.2
See application file for complete search history.

(56) References Cited

U.S. PATENT DOCUMENTS

| | | | |
|---|---|---|---|
| 6,819,304 B2 * | 11/2004 | Branson | 345/1.3 |
| 6,873,345 B2 * | 3/2005 | Fukuda et al. | 715/807 |
| 7,286,145 B2 * | 10/2007 | Sunata | 345/671 |
| 2001/0013875 A1 * | 8/2001 | Soohoo | 345/671 |
| 2002/0039109 A1 * | 4/2002 | Mamiya et al. | 345/667 |
| 2002/0190947 A1 * | 12/2002 | Feinstein | 345/158 |
| 2003/0006995 A1 * | 1/2003 | Smith et al. | 345/671 |

FOREIGN PATENT DOCUMENTS

| | | |
|---|---|---|
| JP | 5-133980 A | 5/1993 |
| JP | 6-4208 A | 1/1994 |
| JP | 7-271505 A | 10/1995 |
| JP | 11-331731 A | 11/1999 |
| JP | 2001-289650 A | 10/2001 |
| JP | 2002-171316 A | 6/2002 |
| JP | 2002-268622 A | 9/2002 |
| JP | 2002-297284 A | 10/2002 |

\* cited by examiner

*Primary Examiner*—Richard Hjerpe
*Assistant Examiner*—Kimnhung Nguyen
(74) *Attorney, Agent, or Firm*—Frishauf, Holtz, Goodman & Chick, P.C.

(57) ABSTRACT

In a portable telephone, a sensor constructed of, for example, a 3-axial acceleration sensor is built in the vicinity of a display unit which is provided on a main body of the portable telephone. When a user moves the display unit along a vertical direction (Z-axis direction) with respect to a display screen thereof while the user holds the appliance main body, the sensor senses both a move direction and a move amount of the display unit, and thus, information displayed on the display screen of the display unit is enlarged, or compressed in display magnification defined in response to the sensed move amount. As a result, a display size of the information displayed on the display screen can be changed in such a manner that the user may have such a natural feeling achieved by moving a magnifying glass.

15 Claims, 16 Drawing Sheets

FIG. 22

| DISPLAY MAGNIFICATION UNIT NUMBER | DISPLAY MAGNIFICATION |
|---|---|
| -2 | 50% |
| -1 | 75% |
| 0 | 100% |
| +1 | 150% |
| +2 | 200% |

ELECTRONIC APPLIANCE HAVING MAGNIFYING-GLASS DISPLAY FUNCTION, DISPLAY CONTROLLING METHOD, AND DISPLAY CONTROL PROGRAM

BACKGROUND OF THE INVENTION (1) Field of the Invention

The present invention generally relates to an electronic appliance, a display controlling method, and a display control program, which are used in the electronic appliance. More specifically, the present invention is directed to such a portable type electronic appliance such as a portable telephone, PDA (Personal Digital Assistants), and a digital camera, which is equipped with a so-called "magnifying-glass display function", and also directed to a display controlling method and a display control program, which are executed in the portable type electronic appliance.

(2) Description of the Related Art

Very recently, portable telephones (portable type telephone apparatus) operable in a PHS (Personal Handyphone System) system and a cellular system (mobile telephone system) simply own not only telephone communication functions, but also such a function capable of being connected to the Internet, so that various sorts of information can be displayed on these portable telephones. On the other hand, while portable telephones equipped with cameras have been popularized in this technical field, images photographed by these cameras can be displayed on these portable telephones equipped with the cameras. Also, since portable terminals such as PDA are utilized as various types of information tools, there are many opportunities that images such as maps are displayed via the Internet on these portable terminals.

With respect to map display methods, the following technical idea is known. That is, for instance, while an enlarging button and a compressing button are provided on a display screen, a map displayed on the display screen is enlarged and/or compressed by manipulating these enlarging/compressing buttons. Also, such an enlarging/compressing technical idea is known in this field. That is, while a touch panel is utilized, a map is enlarged and/or compressed by moving a finger of a user on the touch panel.

However, in the above-described conventional display methods, the images cannot be displayed in the enlarging/compressing operation with having natural feelings which could be realized by moving a magnifying glass.

SUMMARY OF THE INVENTION

The present invention has been made to solve the above-described problem of the conventional techniques, and therefore, has an object to provide such an electronic appliance. That is, the electronic appliance, according to an aspect of the present invention, is featured by that in a portable type electronic appliance having a display unit at a predetermined position of a main body of the portable type electronic appliance, an electronic appliance is comprised of: a storage unit for storing thereinto information which is displayed on a display screen of the display unit; a move amount detecting unit for detecting a move amount in such a case that while the appliance main body is held, the display unit is moved along a substantially vertical direction with respect to the display screen thereof; and a display control unit for causing the information stored in the storage unit to be displayed on the display screen, and for dynamically changing a display size of the information in response to the move amount of the display unit along the substantially vertical direction, which is detected by the move amount detecting unit.

In other words, when the display unit is moved along such a direction directed from a rear surface of the display screen thereof to a front surface thereof, the information is enlarged in a ratio defined in response to a move amount obtained at this time to be displayed in the enlarge manner, whereas when the display unit is moved along a direction opposite to the above-described direction, the information is compressed in a ratio defined in response to a move amount obtained at this time to be displayed in the compress manner.

Otherwise, when the display unit is moved along such a direction directed from a rear surface of the display screen thereof to a front surface thereof, the information is compressed in a ratio defined in response to a move amount obtained at this time to be displayed in the compress manner, whereas when the display unit is moved along a direction opposite to the above-described direction, the information is enlarged in a ratio defined in response to a move amount obtained at this time to be displayed in the enlarge manner.

Furthermore, such a condition that when the display unit is moved along any one of the move directions, the information is enlarged, or compressed may be arbitrarily set by a user in advance.

Also, in the above-described electronic appliance, the electronic appliance may be further comprised of a display magnification display unit for displaying present display magnification at a predetermined position on the display screen of the display unit in a specific display mode. As the display mode, for example, there are a numeral value, a slide bar, and a meter, which indicate present display magnification.

Also, in the above-described electronic appliance, the electronic appliance is further comprised of: an instruction unit for instructing an initializing display mode; and when the initializing display mode is instructed by the instruction unit, the display control unit returns the condition of the information displayed on the display screen of the display unit to such a condition before the display size thereof is changed, and then displays the information whose display size has been returned.

Also, in the above-described electronic appliance, the electronic appliance is further comprised of: a table unit into which a magnification value per a unit move amount has previously been set with respect to each of modes; and the display control unit refers to the table unit every the mode so as to determine display magnification with respect to a move amount of the display screen of the display unit along the substantially vertical direction.

Also, in the above-described electronic appliance, the electronic appliance is further comprised of: a magnification setting unit for arbitrarily setting a magnification value per a unit move amount; and the display control unit determines display magnification with respect to a move amount of the display screen of the display unit along the substantially vertical direction based upon the magnification value arbitrarily set by the magnification setting unit.

Also, in the above-described electronic appliance, the electronic appliance is further comprised of: a magnifying-glass mode operation button for allowing the changing process operation of the display size by the display control unit; and only when the magnifying-glass mode operation button is depressed, the display control unit executes a display control operation for dynamically changing the display size of the information in response to the move amount of the display unit along the substantially vertical direction, which is detected by the move amount detecting unit.

Also, in the above-described electronic appliance, the display control unit controls not to change the display size of the information in such a case that the move amount of the display unit along the substantially vertical direction, which is detected by the move amount detecting unit, is smaller than, or equal to a predetermined value.

Also, in the above-described electronic appliance, the display control unit controls not to change the display size of the information in such a case that a move direction of the display unit along the substantially vertical direction, which is detected by the move amount detecting unit, is different from a move direction of the display unit along the substantially vertical direction just before the first-mentioned move direction is detected.

Also, in the above-described electronic appliance, in such a case that the move amount detecting unit detects that the display unit has been moved along the substantially vertical direction over a distance longer than, or equal to a predetermined distance, the display control unit enlarges and/or compresses the display size of the information in a predetermined ratio.

Also, in the above-described electronic appliance, the display control unit is further comprised of: a magnifying-glass enlarging mode button for instructing an enlarging process operation of the display size; and a magnifying-glass compressing mode button for instructing a compressing process operation of the display size; and wherein: in such a case that the move amount detecting unit detects that the display unit has been moved over the distance longer than, or equal to the predetermined distance along the substantially vertical direction, when the magnifying-glass enlarging mode button is depressed, the display control unit enlarges the display size of the information in the predetermined ratio, whereas in such a case that the move amount detecting unit detects that the display unit has been moved over the distance longer than, or equal to the predetermined distance along the substantially vertical direction, when the magnifying-glass compressing mode button is depressed, the display control unit compresses the display size of the information in the predetermined ratio.

Also, in the above-described electronic appliance, in such a case that the move amount detecting unit detects that the display unit has been moved along the substantially vertical direction over the distance longer than, or equal to the predetermined distance, the display control unit selectively controls to enlarge and compress the display size of the information in accordance with the detected move direction of the display unit.

Also, in the above-described electronic appliance, the display control unit controls to enlarge and/or compress the display size of the information at a speed defined in response to the move amount of the display unit along the substantially vertical direction by the move amount detecting unit.

An electronic appliance, according to another aspect of the present invention, is featured by that in a portable type electronic appliance having a display unit at a predetermined position of a main body of the portable type electronic appliance, an electronic appliance is comprised of: a storage unit for storing thereinto information which is displayed on a display screen of the display unit; a first move amount detecting unit for detecting a first move amount in such a case that while the appliance main body is held, the display unit is moved along a substantially vertical direction with respect to the display screen thereof; a second move amount detecting unit for detecting a second move amount in such a case that while the appliance main body is held, the display unit is moved along a substantially horizontal direction with respect to the display screen thereof; and a display control unit for reading a portion displayable on the display screen of the display unit from the information stored in the storage unit to display the read portion, and for dynamically changing a display size of the read portion of the information in response to the first move amount of the display unit along the substantially vertical direction, which is detected by the move amount detecting unit, and also, for dynamically changing the display size of the read portion of the information in response to the second move amount of the display unit along the substantially horizontal direction, which is detected by the move amount detecting unit.

Also, in the above-described electronic appliance, the electronic appliance is further comprised of: an instruction unit for instructing an initializing display mode; and when the initializing display mode is instructed by the instruction unit, the display control unit returns the condition of the information displayed on the display screen of the display unit to such a condition before the display size thereof is changed, and also returns a display range of the information to such a condition before the display range thereof is changed, whereby the display control unit displays the information whose display size and display range have been changed.

Also, in the above-explained electronic appliance, the display control unit sets a changing speed of the display range by the movement of the display screen of the display unit along the substantially horizontal direction in response to the move distance of the display screen of the display unit along the substantial vertical direction.

Also, in the above-described electronic appliance, the electronic appliance is further comprised of: a magnifying-glass mode operation button for allowing the changing process operation of the display size by the display control unit; and only when said magnifying-glass mode operation button is depressed, the display control unit executes a display control operation for dynamically changing the display size of the information in response to the first move amount of the display unit along the substantially vertical direction, which is detected by the move amount detecting unit; and also executes a display control operation for dynamically changing the display size of the information in response to the second move amount of the display unit along the substantially horizontal direction, which is detected by the move amount detecting unit.

Also, a display control method, according to another aspect of the present invention, is featured by such a display control method used in a portable type electronic appliance having a display unit at a predetermined position of a main body of the portable type electronic appliance, comprising: a step for displaying information to be displayed on a display screen of the display unit; a step for detecting a move amount when the display unit is moved along a substantially vertical direction with respect to the display screen thereof; and a step for dynamically changing a display size of the information in response to the detected move amount of the display unit along the substantially vertical direction.

Also, a display control method, according to another aspect of the present invention, is featured by such a display control method used in a portable type electronic appliance having a display unit at a predetermined position of a main body of the portable type electronic appliance, comprising: a step for reading a portion displayable on the display screen of the display unit from information to be displayed and for displaying the read portion; a step for detecting a first move amount when the display unit is moved along a substantially vertical direction with respect to the display screen thereof; a step for detecting a second move amount when the display unit is moved along a substantially horizontal direction with respect to the display screen thereof; and a step for dynamically changing a display size of the read portion of the information in response to the first move amount of the display screen of the display unit along the substantially vertical direction, and for dynamically changing a display size of the read portion of the information in response to the second move amount of the display screen of the display unit along the substantially horizontal direction.

Further, a display control program, according to a further aspect of the present invention, is featured by that in a computer-readable program used in a portable type electronic appliance having a display unit at a predetermined position of a main body of the portable type electronic appliance, a display control program causes a computer to execute: a step for displaying information to be displayed on a display screen of the display unit; a step for detecting a move amount when the display unit is moved along a substantially vertical direction with respect to the display screen thereof; and a step for dynamically changing a display size of the information in response to the detected move amount of the display unit along the substantially vertical direction.

Moreover, a display control program, according to a still further aspect of the present invention, is featured by that in a computer-readable program used in a portable type electronic appliance having a display unit at a predetermined position of a main body of the portable type electronic appliance, a display control program causes a computer to execute: a step for reading a portion displayable on the display screen of the display unit from information to be displayed and for displaying the read portion; a step for detecting a first move amount when the display unit is moved along a substantially vertical direction with respect to the display screen thereof; a step for detecting a second move amount when said display unit is moved along a substantially horizontal direction with respect to the display screen thereof; and a step for dynamically changing a display size of the read portion of the information in response to the first move amount of the display screen of the display unit along the substantially vertical direction, and for dynamically changing a display size of the read portion of the information in response to the second move amount of the display screen of the display unit along the substantially horizontal direction.

BRIEF DESCRIPTION OF THE DRAWINGS

For a better understanding of the present invention, reference is made of a detailed description to be read in conjunction with the accompanying drawings, in which:

FIG. 22 is a diagram for representing an example of a display magnification table which is employed in the portable telephone of the sixth embodiment of the present invention.

DESCRIPTION OF THE PREFERRED EMBODIMENTS

Referring now to drawings, various embodiment modes of the present invention will be described in detail.

Outer Construction of First Portable Telephone

Figure 1:
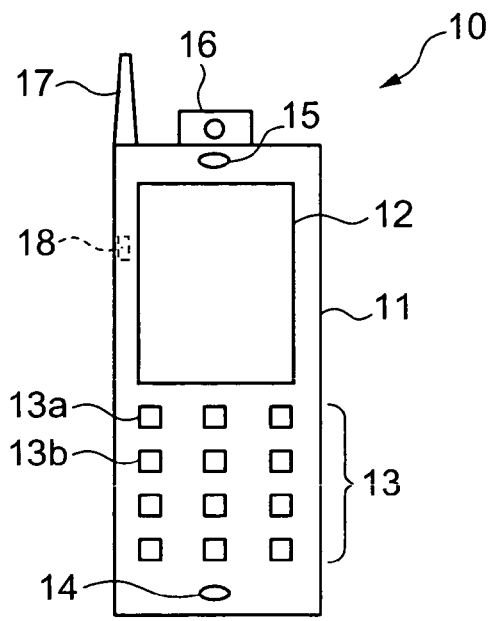
FIG. 1 is a diagram for illustratively showing an outer structure in the case that a portable telephone is exemplified as an electronic appliance of the present invention.

FIG. 1 is a diagram for illustratively showing an outer construction in the case that a portable telephone 10 is exemplified as an electronic appliance of the present invention.

As indicated in FIG. 1, a display unit 12, an input unit 13, a microphone 14, a speaker 15, and the like are provided on a surface of an appliance main body 11 of this portable telephone 10.

The display unit 12 is constructed of, for example, a color displayable type compact LCD (Liquid Crystal Display), and contains a flat plane-shaped display screen. Various sorts of menus and input data are displayed on this flat plane-shaped display screen. Also, an image photographed by a camera 16 and an image which is received from an external image source are displayed on this display screen, while the camera 16 is provided in this portable telephone 10. Also, when a photographing operation is carried out by operating the camera 16, the display screen of this display unit 12 may function as an electronic view finder, and an image of a photographic subject may be viewed on the electronic view finder.

The input unit 13 is used so as to input data and also to instruct a function. This input unit 13 is arranged by containing dial/character buttons for entering a telephone number and a character; a power supply button for turning ON/OFF a power supply of this portable telephone 10; a transmission button used to make a telephone call and transmit an electronic mail; a function selecting button for selecting various functions provided on the portable telephone 10; a camera button for initiating the camera 16; and the like. Furthermore, in this first embodiment, the input unit 13 is provided with a special display mode button 13a for designating a special display mode; and an initializing display mode button 13b for designating an initializing display mode.

The above-explained special display mode corresponds to such a mode that a display size of information and a display range of this information displayed on the display screen are changed in response to a move direction and a move amount of the display unit 12. A detailed content of this special display mode will be explained later by referring to FIG. 2 and FIG. 3. Also, the above-described initializing display mode corresponds to such a mode by which such a condition that both a display size and a display range have been changed based upon the special display mode is returned to the original condition.

Both the microphone 14 and the speaker 15 are employed as a telephone microphone and a telephone receiver during a telephone conversation. The microphone 14 is arranged at a lower portion of the appliance main body 11, and the speaker 15 is arranged at an upper portion of the appliance main body 11 in order that this microphone 14 may be located at an ear of a user and the speaker 15 is located at a mouth of this user during a telephone conversation.

The camera 16 is arranged in such a manner that this camera 16 is rotatably set to, for example, an upper portion of the appliance main body 11. The camera 16 performs a photographing operation as to either a still picture or a moving picture in response to a depressing operation of the camera button of the input unit 13. It should be noted that this camera 16 may be alternatively fixed to the appliance main body 11, or may be detachably mounted on the appliance main body 11. Further, an antenna 17 used to transmit and/or receive wireless (radio) electromagnetic waves is mounted on an upper portion of the appliance main body 11 in a telescopic manner.

Also, a sensor 18 for sensing movement is build in the vicinity of the display unit 12 within this appliance main body 11. This movement sensing sensor 18 is constituted by, for example, a three-axial acceleration sensor. This sensor 18 is provided in order to sense a move amount obtained when the display unit 12 is moved along a vertical direction (Z-axis direction) with respect to the display screen of this display unit 12 while the user brings the appliance main body 11, and also to sense another move amount obtained when the display unit 12 is moved along a horizontal direction (X-axis and Y-axis directions) with respect to the display screen of this display unit 12 while the user brings the appliance main body 11.

Display Changes of Display Unit 12

FIG. 2 is a diagram for illustratively indicating display changes in the case that the display unit 12 of the portable telephone 10 is moved along the vertical direction (Z-axis direction).

Figure 2A:
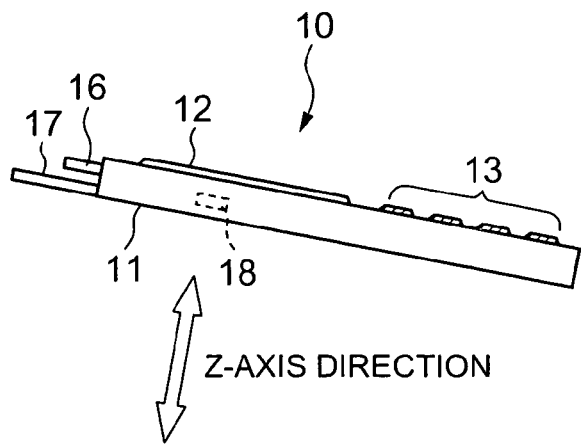
FIG. 2A and FIG. 2B are diagrams for representing display changes in the case that a display unit of the portable telephone shown in FIG. 1 is moved along a vertical direction (Z-axis direction)
Figure 2B:
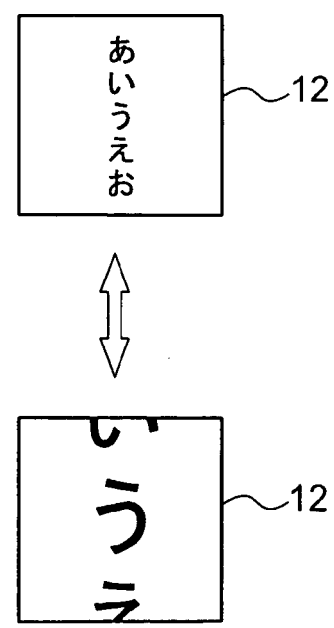

In the portable telephone 10 of this first embodiment, for instance, when an image which has been photographed by the camera 16, or such an image which has been acquired via the Internet from an external image source is displayed on the display unit 12, as represented in FIG. 2A, if the display unit 12 is moved along the vertical direction with respect to the display screen thereof, as shown in FIG. 2B, a display size of the image displayed on the display screen is dynamically changed in response to a move amount of this display unit 12 along the Z-axis direction in such a manner that the user views this image while the user is moving a "magnifying glass." In other words, the image which is being displayed on the display screen of the display unit 12 may be displayed in either an enlarging manner or a compressing manner in response to movement of the display unit 12.

FIG. 3 is a diagram for illustratively indicating display changes in the case that the display unit 12 of the portable telephone 10 is moved along the horizontal direction (X-axis and Y-axis directions).

Figure 3A:
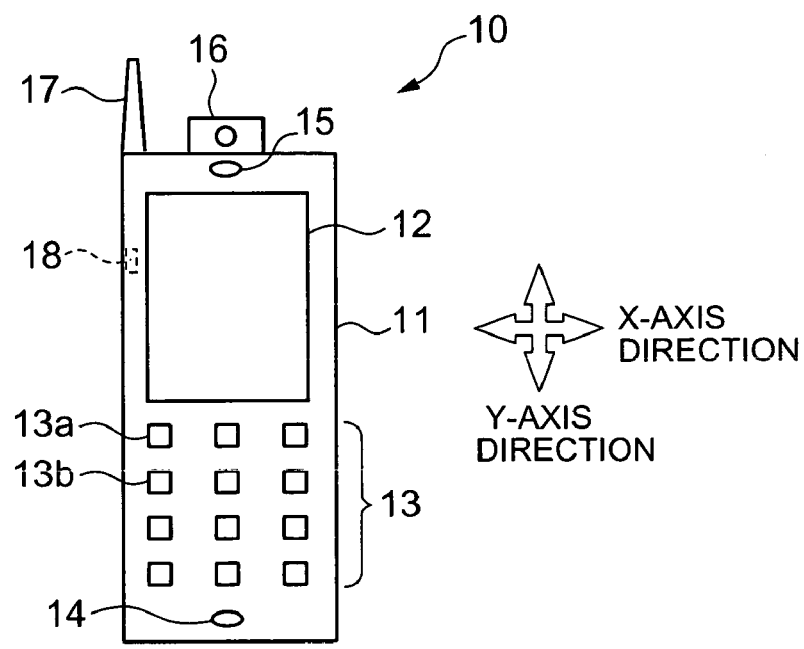
FIG. 3A and FIG. 3B are diagrams for representing display changes in the case that the display unit of the portable telephone shown in FIG. 1 is moved along a horizontal direction (X-axis and Y-axis directions)
Figure 3B:
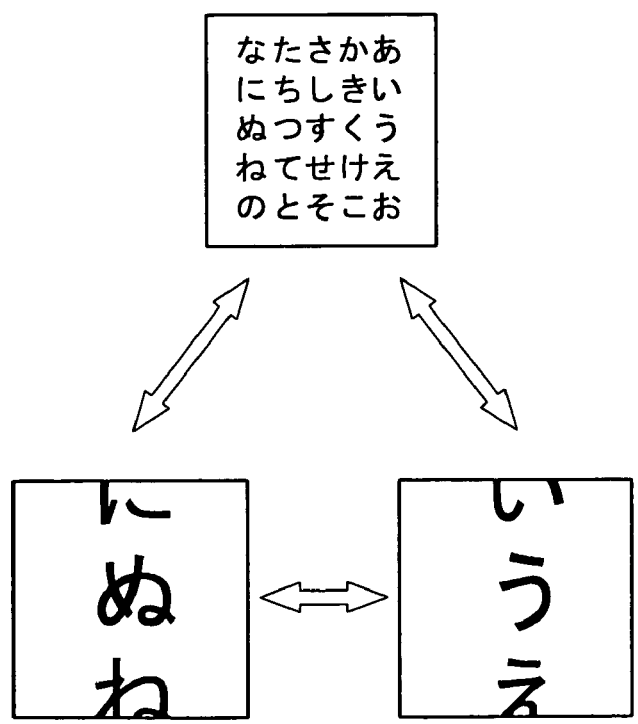

In addition to the movement of the display unit 12 along the vertical direction, furthermore, as indicated in FIG. 3A, when the display unit 12 is moved along the horizontal direction with respect to the display screen thereof, the display range of this image is dynamically changed in response to a move amount of the display unit 12 as represented in FIG. 3B. In other words, such an image which is displayed on the display screen of the display unit 12 is partially moved in order to be adapted to the movement of the display unit 12.

FIG. 3B exemplifies such a case that under the condition that the display unit 12 is moved along the vertical direction so as to display the images (characters) in the enlarging manner, the display unit 12 is further moved along the horizontal direction so as to change the display range.

In this case, a changing speed of the display range, namely, a scrolling speed when the display unit 12 is moved along the horizontal direction depends upon a move distance of the display unit 12 along the vertical direction. In other words, in such a case that the user largely moves the display unit 12 along the vertical direction (namely, in such a case that move distance from initial position is long), if the user moves the display unit 12 along the horizontal direction at this position, then the display ranges are quickly switched. Conversely, in such a case that the user shortly moves the display unit 12 along the vertical direction (namely, in such a case that move distance from initial position is short), if the user moves the display unit 12 along the horizontal direction at this position, then the display ranges are slowly switched.

In addition to the above-described method in which the scrolling speed along the horizontal direction is caused to depend upon the move distance of the display unit 12 along the vertical direction, for example, another method may be conceived. That is, the scrolling speed of the display unit 12 along the horizontal direction may be made constant irrespective of the move distance of the display unit 12 along the vertical direction. Alternatively, opposite to the above-explained example, the portable telephone 10 may be alternatively arranged in such a case that the user largely moves the display unit 12 along the vertical direction (namely, in such a case that move distance from initial position is long), the horizontal scrolling speed is decreased in order that the display ranges are slowly switched. Furthermore, the portable telephone 10 may be alternatively arranged in such a case that the user shortly moves the display unit 12 along the vertical direction (namely, in such a case that move distance from initial position is short), the horizontal scrolling speed is increased in order that the display ranges are quickly switched.

Circuit Arrangement of Portable Telephone 10

Figure 4:
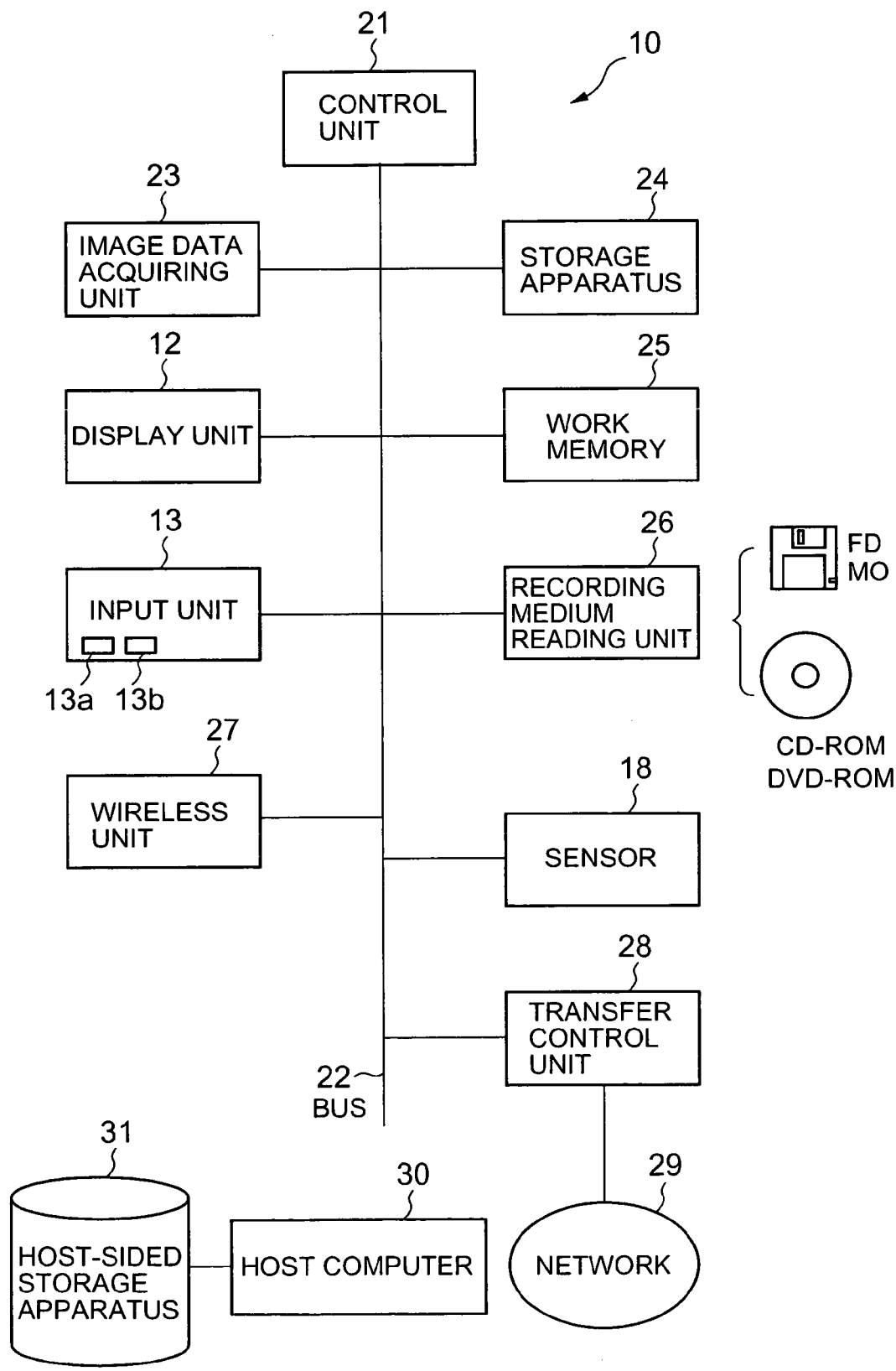
FIG. 4 is a block diagram for schematically indicating a circuit arrangement of the portable telephone shown in FIG. 1.

FIG. 4 is a schematic block diagram for showing a circuit arrangement of the portable telephone 10.

In this portable telephone 10, a control unit 21 constructed of a microprocessor (CPU) is employed. Under control of this control unit 21, various sorts of functions are executed which are provided in the portable telephone 10. As the various sorts of functions employed in the portable telephone 10, in addition to the telephone function corresponding to the basic function as the portable telephone, a mail function, a personal management function, a photograph function, and the like are provided. The mail function is used so as to transmit/receive electronic mail data via a communication network such as the Internet between the own portable telephone 10 and an external terminal. The personal management function is used to manage names, addresses, and the like of communication terminal owners. The photograph function is used in order to photograph either a still image or a moving picture by operating the camera 16.

The display unit 12, the input unit 13, the sensor 18, and the like are connected via a system bus 22 to the control unit 21, and furthermore, an image data acquiring unit 23, a storage apparatus 24, a work memory 25, a recording medium reading unit 26, a wireless unit 27, a transfer control unit 28, and the like are connected via the system bus 22 to this control unit 21, which are shown in FIG. 4.

The control unit 21 reads out either a program which has been previously in the storage apparatus 24 or another program previously stored in a recording medium such as an FD (floppy disk) via the above-explained reading medium reading unit 26, so that the control unit 21 executes various sorts of process operations in accordance with sequential instructions which are described in this read program. It should be understood that a method for providing a program is not limited only to such a program providing method by using a recording medium, but also a method for providing a program via a network 29 such as the Internet from an external terminal.

Also, as explained above, the display unit 12 is constructed of, for instance, a color displayable type compact LCD, and displays thereon various sorts of data. The screen size of this display unit 12 is relatively small, and there are some cases that such an image whose size is larger than this screen size is displayed. The input unit 13 is used so as to input data and also instruct a function, and contains various sorts of operation buttons containing the dial button, the power supply button, the transmission button, the function selection button, the camera button, and the like. Also, the input unit 13 is provided with the special display mode button 13a for instructing the special display mode, and the initializing display mode button 13b for instructing the initializing display mode.

The sensor 18 is employed so as to detect both a move direction and a move amount of the display unit. In this first embodiment, as this sensor 18, a miniature 3-axial acceleration sensor having a size substantially equal to a finger tip size is employed.

The 3-axial acceleration sensor corresponds to such a single sensor which can sense 3-axial acceleration, namely 3 sets of acceleration along the X-axis direction, the Y-axis direction, and the Z-axis direction. This 3-axial acceleration sensor owns such a construction that, for example, piezoelectric ceramics is joined to a metal plate, a weight is joined to the metal plate, and an outer peripheral portion is supported. In the case that acceleration is applied along the Z-axis direction, the piezoelectric ceramics is deformed by this applied acceleration along the Z-axis direction. At this time, stress is produced which is directly proportional to the applied acceleration, and such a voltage which is directly proportional to this stress is outputted from this sensor 18. On the other hand, in such a case that acceleration is applied along the X-axis direction, and the Y-axis direction, the piezoelectric ceramics is deformed by this applied acceleration along the X-axis direction and the Y-axis direction. At this time, similar to the Z-axis direction, such voltages which are directly proportional to the acceleration are outputted from this sensor 18.

While this 3-axial acceleration sensor is employed as the above-described sensor 18, this sensor 18 is assembled in the vicinity of the display unit 12 employed in the appliance main body 11 in such a manner that the Z-axis direction is located perpendicular to the display screen. As a result, when the display unit 12 is moved along the Z-axis direction with respect to the display screen thereof while the user grips the appliance main body 11, a voltage signal which is produced in response to acceleration applied at this time is outputted from the sensor 18. Then, this voltage signal is A/D-converted into digital voltage signal, and thereafter, this digital voltage signal is digitally processed by way of an integral calculation, so that both a speed and a move amount along the Z-axis direction can be acquired. This movement calculation method may be similarly performed also as to the X-axis direction and the Y-axis direction.

It should also be noted that in this first embodiment, the following descriptions thereof are made based upon the following assumption. That is, while the sensor 18 is equipped with the A/D converting function, after the respective voltage signals along the Z-axis direction, the X-axis direction, and the Y-axis direction are A/D-converted, the digital voltage signals are outputted to the control unit 21.

As previously explained with reference to FIG. 2 and FIG. 3, since the control unit 21 receives the digital output signals of this sensor 18, the control unit 21 executes a process operation (namely, enlarging/compressing process operation) for changing a display size in response to a move amount of the display unit 12 at this time with respect to the movement of the display unit 12 along the X-axis direction, whereas the control unit 21 executes another process operation (namely, scrolling process operation) for changing a display range in response to a move amount of the display unit 12 at this time with respect to the Y-axis direction and the Y-axis direction of the display unit 12.

Returning back to FIG. 4, the image data acquiring unit 23 corresponds to such a structural unit for acquiring image data which is displayed on the display unit 12, concretely speaking, corresponds to the camera 16 shown in FIG. 1. The camera 16 may be previously equipped with respect to the appliance main body 11, or may be detachably mounted on this appliance main body 11. The camera 16 performs a photographing operation of either a still image or a moving picture in response to depression operation of the camera button provided on the input unit 13. It should also be noted that as the above-described image data acquiring means, not only the camera 16 may be employed, but also an image may be alternatively acquired by using, for example, a scanner and the like. Furthermore, image data which has been recorded on a recording medium may be read out by the recording medium reading unit 26 in accordance with the below-mentioned manner. Alternatively, image data may be downloaded via the network 29 from a host computer 30 by the transfer control unit 28.

The storage apparatus 24 corresponds to, for example, an HDD (Hard Disk Drive) and a flash memory, and is used to store thereinto various sorts of data. In this first embodiment, various sorts of program data which contains such a program capable of realizing the electronic appliance of the present invention have been previously stored in the storage apparatus 24.

Figure 5:
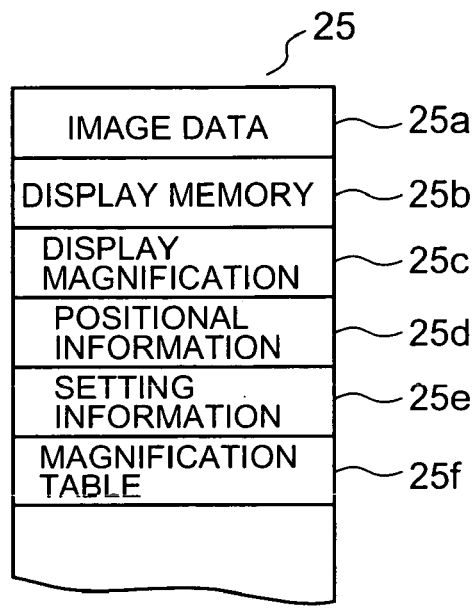
FIG. 5 is a diagram for illustratively showing a construction of a work memory provided in the portable telephone shown in FIG. 1.

The work memory 25 corresponds to, for example, a RAM (Random Access Memory), or the like, and is such a memory which is employed so as to store thereinto various sorts of data required to execute process operations by the control unit 21. In this first embodiment, as shown in FIG. 5, this work memory 25 is provided with an image storage area 25a, a display memory area 25b, a display magnification storage area 25c, a positional information storage area 25d, a setting information storage area 25e, and a magnification table 25f, and so on. The image storage area 25a is employed so as to store thereinto image data. The display memory area 25b is used to expand this image data to the display unit 12 as display data. The display magnification storage area 25c is used to store thereinto present display magnification. The positional information storage area 25d is used to store thereinto positional information of the X axis direction and positional information of the Y axis direction. The setting information storage area 25e is used to store there into various sorts of setting information as to display operations. In the magnification table 25f, display magnification has been set with respect to each of the operation modes.

Figure 6:
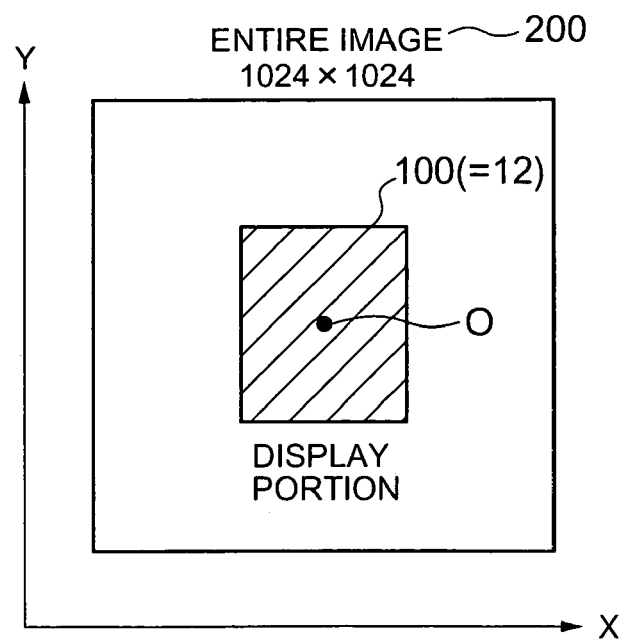
FIG. 6 is an explanatory diagram for explaining a size of image data which is displayed on a display screen of the display unit employed in the portable telephone of FIG. 1.

The above-described positional information of the respect X axis and Y axis will now be explained more in detail. FIG. 6 represents both an entire image 200 (1024×1024) and a partial image 100 which is to be displayed on the display unit 12 provided on the appliance main body 11 of the portable telephone 10. Symbol "O" indicates a center point of this partial image 100. It should be understood that a size of this partial image 100 may be changed in an enlarge manner, or a compress manner, and also, a position of this partial image 100 may be moved within the entire image 200. In other words, if both positional information of the center point "O" of the partial image 100 on the X axis and positional information thereof on the Y axis can be acquired, then it is possible to grasp that the partial image 100 is presently located at which place within the entire image 200, since the positional information on the X axis and the positional information on the Y axis as to the partial image 100 are changed in response to a display screen size of the display unit 12.

The recording medium reading unit 26 is used so as to read various sorts of information such as programs and images, which have been recorded on a recording medium. At this recording medium, for example, FD, MO, CD-ROM, DVD-ROM, and the like may be employed.

The wireless unit 27 corresponds to a structural unit for executing a wireless communication operation in accordance with a predetermined communication protocol. It should also be noted that since this wireless system 27 has no direct relationship with the inventive idea of the present invention, explanations thereof is omitted. Also, in an actual case, an audio unit (not shown) is provided which performs a voice signal processing operation during a telephone conversation, and both the microphone 14 and the speaker 15 shown in FIG. 1 are connected to this audio unit.

The transfer control unit 28 executes a transfer control operation as to data via the network 29 between the own transfer control unit 28 and the host computer 30. This host computer 30 is equipped with a storage apparatus 31 having a large storage capacity. This host computer 30 may function as a server capable of distributing various images with respect to the respective terminals including the above-explained portable telephone 10.

In addition to the above-explained structural units, a power supply unit (not shown) which is constructed of, for example, a secondary battery is employed in the portable telephone 10. While the portable telephone 10 is brought by the user, the power supply unit supplies electric power to the respective devices including the control unit 21, which is required to drive these devices.

First Processing Operation of Portable Telephone 10

Next, a description is made of process operations of the portable telephone 10 functioning as a first embodiment mode of the present invention.

Figure 7:
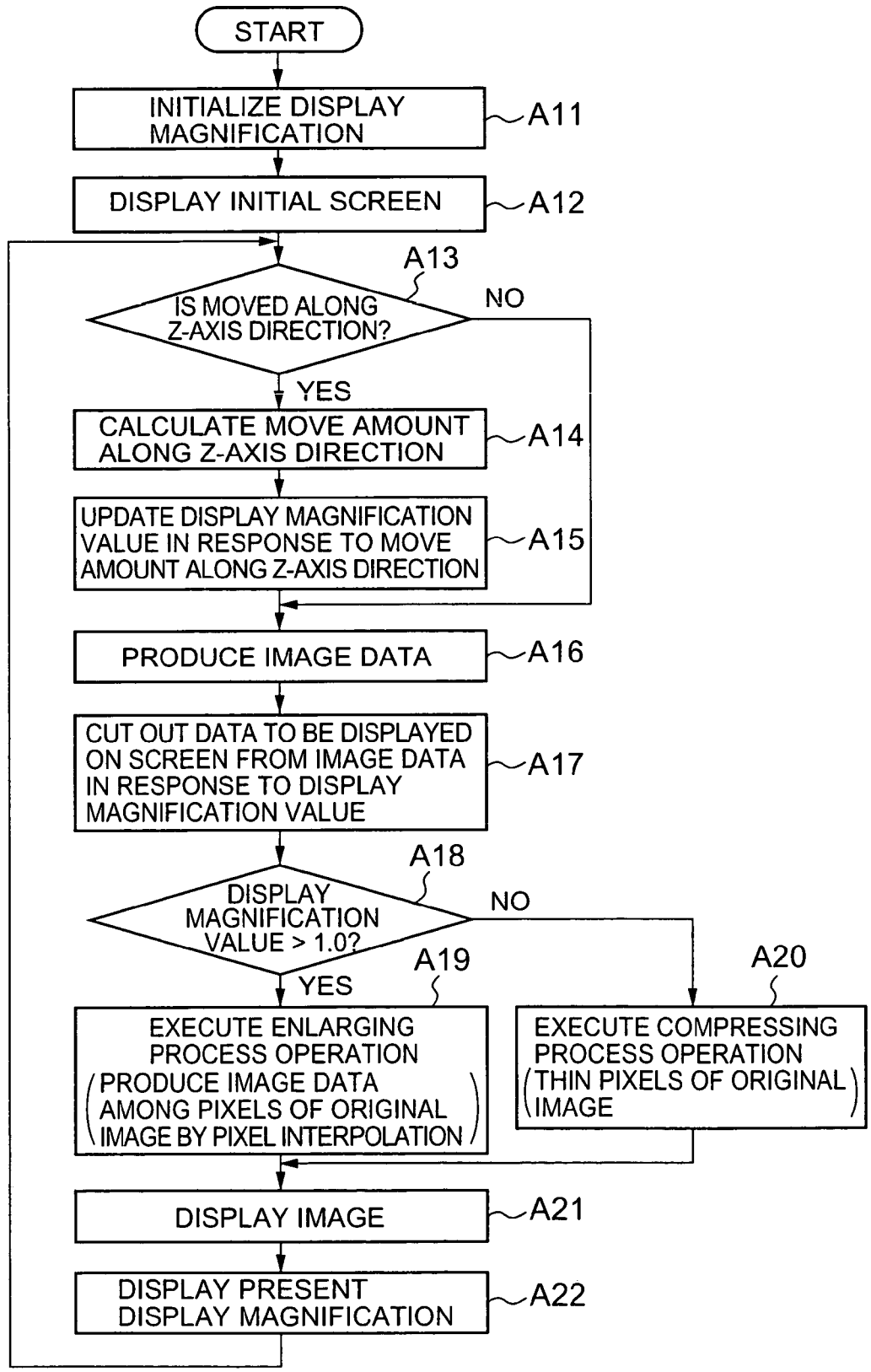
FIG. 7 is a flow chart for describing display process operations of the portable telephone operated in accordance with a first embodiment of the present invention, namely, such a flow chart for indicating a display process flow of image data in the case that the display unit thereof is moved along the Z-axis direction.

FIG. 7 is a flow chart for describing display process operations of the portable telephone 10 according to the first embodiment of the present invention. This flow chart indicates display process operation of image data in such a case that the display unit 12 employed in the appliance main body 11 of this portable telephone 10 is moved along the Z-axis direction. It should also be noted that the respective process operations shown in FIG. 7 are executed in such a manner that the control unit (CPU) 21 employed in the portable telephone 10 reads the program.

It is now assumed that image data which should be displayed on the display unit 12 has been stored in the image storage area 25a of the work memory 25 under such a condition that this image data has been compressed in accordance with a predetermined compression system. This image data contains, for example, an image photographed by the camera 16, an image which has been previously recorded on the recording medium, and further, such an image which has been downloaded from the host computer 30 via the network 29 such as the Internet.

When such an image data is displayed on the display unit 12, the control unit 21 initializes the display magnification to obtain, for example, "1.0 time (100%)", while this display magnification has been stored in the display magnification storage area 25c of the work memory 25 (step A11). Since the control unit 21 expands the image data stored in the image storage area 25a of the work memory 25 to the display memory area 25b based upon this initialized magnification (100%), an initial screen of this image data is displayed on the display unit 12 (step A12).

In this stage, after the special display mode is designated by depressing the special display mode button 13a provided on the input unit 13 of the portable telephone 10 by the user, when the user moves the display unit 12 provided on the upper surface of the appliance main body 11 along the vertical direction, namely the Z-axis direction with respect to the display screen thereof, this movement of the display unit 12 is sensed by the sensor 18 built in the appliance main body 11 ("YES" of step A13). As previously explained, this sensor 18 is arranged by the 3-axial acceleration sensor. When acceleration is applied to this sensor 18 along the Z-axis direction, this sensor 18 A/D-converts such a voltage signal which is directly proportional to the applied acceleration into a digital voltage signal, and then outputs this digital voltage signal to the control unit 21. When the control unit 21 receives the voltage signal (digital signal) outputted from this sensor 18, the control unit 21 performs the integral calculation process operation as to this digital voltage signal in order to calculate a move amount of the display unit 12 along the Z-axis direction (step A14).

When the move amount of the display unit 12 along the Z-axis direction is obtained, the control unit 21 determines display magnification based upon this move amount, and then updates the display magnification value stored in the display magnification storage area 25c (step A15). In this case, while a magnification value per unit move amount has been previously determined, assuming now that this parameter value is equal to "α", display magnification "N" along an enlarging direction may be expressed by the following formula:

$N$=move amount×α.

In other words, for example, assuming now that α=2.0 [times/10 cm], if the display unit 12 is moved by 10 cm along the (+) Z-axis direction, then the display magnification becomes N=2.0. At this time, the image data is displayed by being enlarged by the magnification of 2.0 times (200%).

On the other hand, display magnification "M" along a compressing direction may be expressed by the following formula:

$M$=1/$N$=1/(move amount×α).

In other words, for instance, assuming now that α=2.0 [times/10 cm], if the display unit 12 is moved by 10 cm along the (−) Z-axis direction, then the display magnification M=0.5. At this time, the image data is displayed by being compressed by the magnification of 0.5 times (50%).

As previously explained, such a condition as to whether the image data is displayed by being enlarged, or by being compressed may be determined by that the display unit 12 is moved along which direction of the Z axis. In this case, assuming now that such a direction directed from the rear surface of the display screen to the front surface thereof is defined as a first direction (under such a condition that user is directed to display screen, display unit 12 is moved close to user), whereas such a direction directed from the front surface of the display screen to the rear surface thereof is defined as a second direction (under such a condition that user is directed to display screen, display unit 12 is moved apart from user), the user can arbitrarily set the following definitions on a mode setting screen (not shown), namely, one definition is made of "movement along first direction is enlargement, and movement along second direction is compression", and another definition is made of "movement along first direction is compression, and movement along second direction is enlargement." This setting information is stored in the setting information storage area 25e of the work memory 25. The control unit 21 calculates either the display magnification "N" of the enlarging direction or the display magnification "M" of the compressing direction based upon the setting information stored in this setting information storage area 25e.

Next, the control unit 12 enlarges/compresses this image data based upon the updated display magnification to change the display size. In this case, the control unit 21 firstly executes such a process operation that, as indicated in FIG. 6, an entire image is expanded to the display memory area 25b (step A16). Then, the control unit 21 cuts out an image portion to be displayed on the screen of the display unit 12 from this entire image in response to the display magnification value (step A17), and then, executes the enlarging/compressing process operation in response to the display magnification value (step A18 to step A20).

Figure 8:
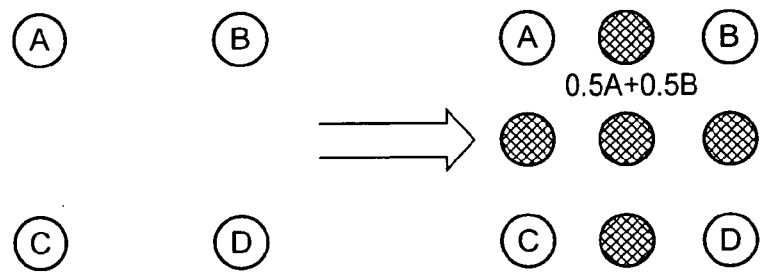
FIG. 8 is a diagram for illustratively showing an example of a pixel interpolating method used in FIG. 7.
Figure 9:
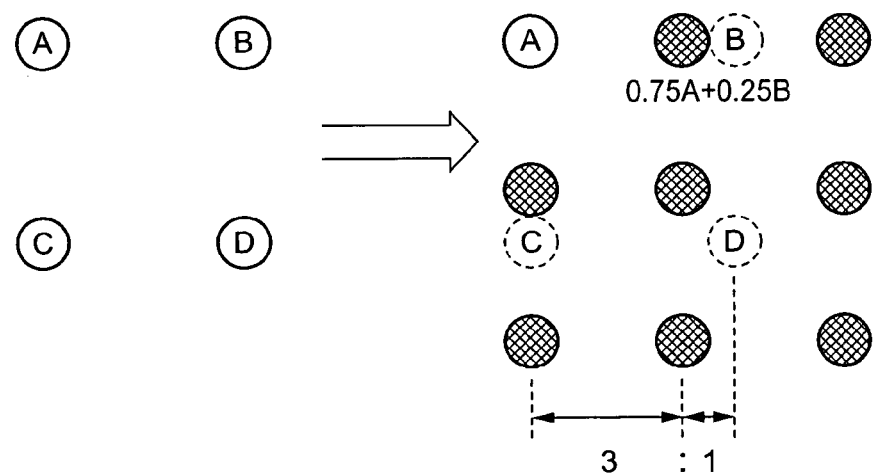
FIG. 9 is a diagram for illustratively showing an example of a pixel interpolating method used in FIG. 7.
Figure 10:
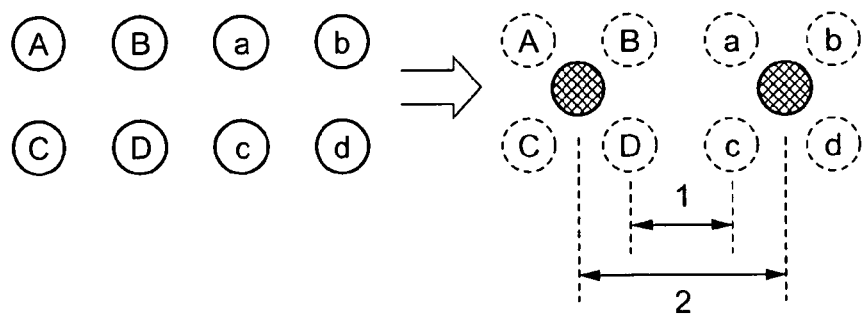
FIG. 10 is a diagram for illustratively indicating an example of a pixel thinning method used in FIG. 7.

In other words, in the case that the display magnification value is larger than "1.0" (namely, "YES" of step A18), the control unit 21 executes a pixel interpolating process operation in response to the display magnification values as shown in FIG. 8 and FIG. 9 with respect to the cut image data, so that the control unit 21 enlarges a display size of this image data (step A19). On the other hand, in the case that the display magnification value is smaller than, or equal to "1.0" (namely, "NO" of step A18), the control unit 21 executes a pixel thinning process operation in response to the display magnification value as shown in FIG. 10 with respect to the cut image data, so that the control unit 21 compresses a display size of this image data (step A20).

It should also be noted that, as previously explained, after the entire image has been firstly produced, the partial image within the range defined in response to the display magnification is cut out from the entire image. Alternatively, only such an image of a portion to be displayed may be produced.

Pixel Interpolating/Thinning Methods of First Portable Telephone

FIG. 8 and FIG. 9 indicate one example of a pixel interpolating method.

In order to enlarge a size of an image from a size of an original image, a total number of pixels constructing the original image is required to be increased. To this end, as shown in FIG. 8, such a pixel is produced which owns an average pixel value of two pixels located adjacent to the first-mentioned pixel along longitudinal and lateral directions, and this newly produced pixel is located between the two pixels so as to interpolate among the respective pixels. As a result, eventually, a total pixel number becomes two times larger than that of the original image along each of the longitudinal and lateral directions, so that an image which has been enlarged 4 times (400%) can be obtained, as compared with the original image. If magnification is not equal to multiplication by an integer, then another interpolating method may be alternatively employed. That is, as represented in FIG. 9, a weighted summation of adjoining pixel values is calculated in response to distances separated from the adjoining pixel values, and then, such a new pixel having this weighted summation value may be produced for an interpolation purpose.

FIG. 10 indicates an example of a pixel thinning method.

In order to compress a size of an image from a size of an original image, such a process operation is carried out in a reverse manner with respect to the above-described interpolating process operation. In other words, a total pixel number of the original image is required to be decreased in accordance with display magnification. For example, as indicated in FIG. 10, an average value is calculated with respect to 4 pixels which are arranged every 2 pixels along the longitudinal direction and the lateral direction and constitute a square, and then, the respective pixels are thinned in such a manner that such a pixel having this averaged pixel value is positioned at a center of these 4 pixels. As a result, an image which has been compressed by ¼ times (25%) is obtained.

As explained above, when the image data is enlarged, or compressed in response to the display magnification value, the control unit 21 again displays the image data which has been enlarged/compressed on the display screen of the display unit 12 (step A21).

Also, the control unit 21 displays the present display magnification in a specific display mode at a predetermined position on the display screen of the display unit 12 (step A22).

Display Examples of Display Magnification

Figure 11:
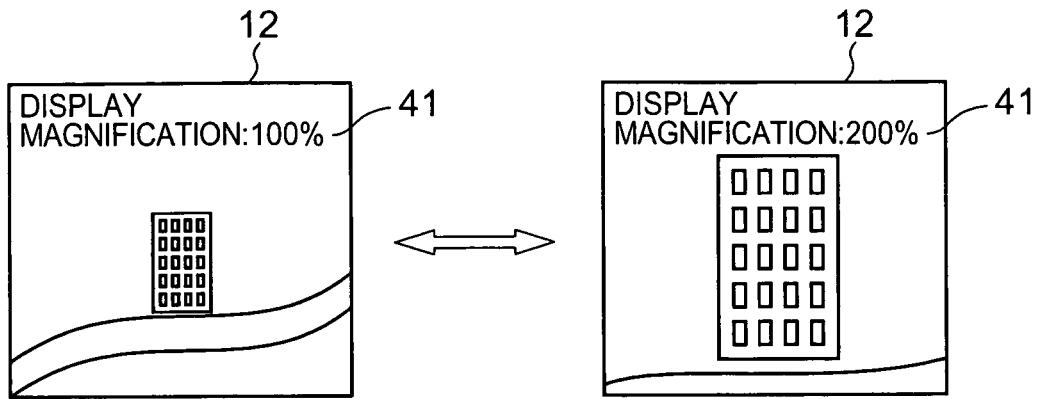
FIG. 11 is a diagram for illustratively representing a display example of display magnification, which is displayed on the display screen of the display unit employed in the portable telephone of FIG. 1, namely, in such a case that the present display magnification is indicated by concrete numeral values.
Figure 12:
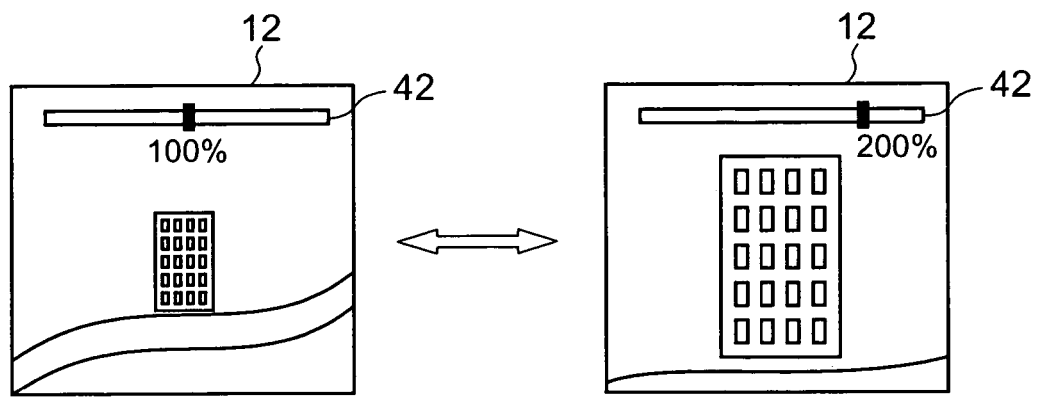
FIG. 12 is a diagram for illustratively representing a display example of display magnification, which is displayed on the display screen of the display unit employed in the portable telephone of FIG. 1, namely, in such a case that the present display magnification is indicated by slide bars.
Figure 13:
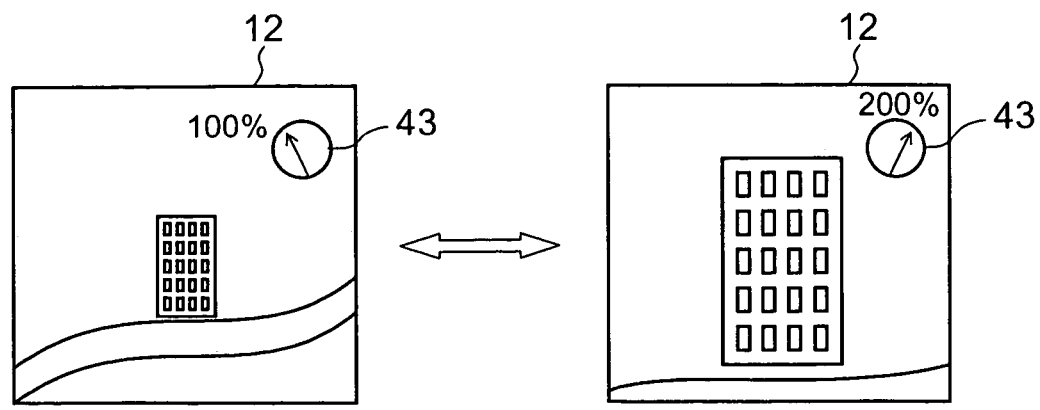
FIG. 13 is a diagram for illustratively representing a display example of display magnification, which is displayed on the display screen of the display unit employed in the portable telephone of FIG. 1, namely, in such a case that the present display magnification is indicated by meters.

FIG. 11 to FIG. 13 show display examples of the display magnification.

FIG. 11 is an example in the case that the present display magnification is displayed on an upper portion of the display screen by employing a concrete numeral value 41, while the numeral value 41 indicative of the present display magnification is indicated by percent. FIG. 12 is an example in the case that the present display magnification is displayed on an upper portion of the display screen by employing a slide bar 42, while the position of this slide bar 42 is moved in response to the present display magnification value. FIG. 13 is an example in the case that the present display magnification is displayed on an upper portion of the display screen by employing a meter 43, a needle of this meter 43 is moved in response to the present display magnification value.

In the display example shown in FIG. 11 to FIG. 13, the present display magnification values are displayed on the upper portions of the display screens. Alternatively, this display position may be located at any places, for example, a lower portion of the display screen, which do not cause any problem when image data is displayed.

As previously explained, under such a condition that the certain image data is displayed on the display unit 12 of the portable telephone 10, when the user moves this display unit 12 is moved upwardly/downwardly along the Z-axis direction, the display size of this image data can be changed by the display magnification defined in response to the movement amount of this display unit 12.

Second Portable Telephone

Next, a second embodiment mode of the present invention will be described.

In the above-explained first embodiment mode, the display process operations as to the movement of the display unit 12 of the portable telephone 10 along the Z-axis direction has been described. In the second embodiment mode, a description will now be made of display process operations which also contain a display process operation with respect to movement of the display unit 12 along both an X-axis direction and a Y-axis direction. As previously explained in FIG. 3, with respect to the movement of the display unit 12 along the X-axis direction and the Y-axis direction, the display ranges are changed in connection with the movement. Similar to the first embodiment, the detections of the move amounts at this time are carried out by employing the sensor 18 which is constructed of the 3-axial acceleration sensor.

Second Processing Operation of Portable Telephone 10

Figure 14:
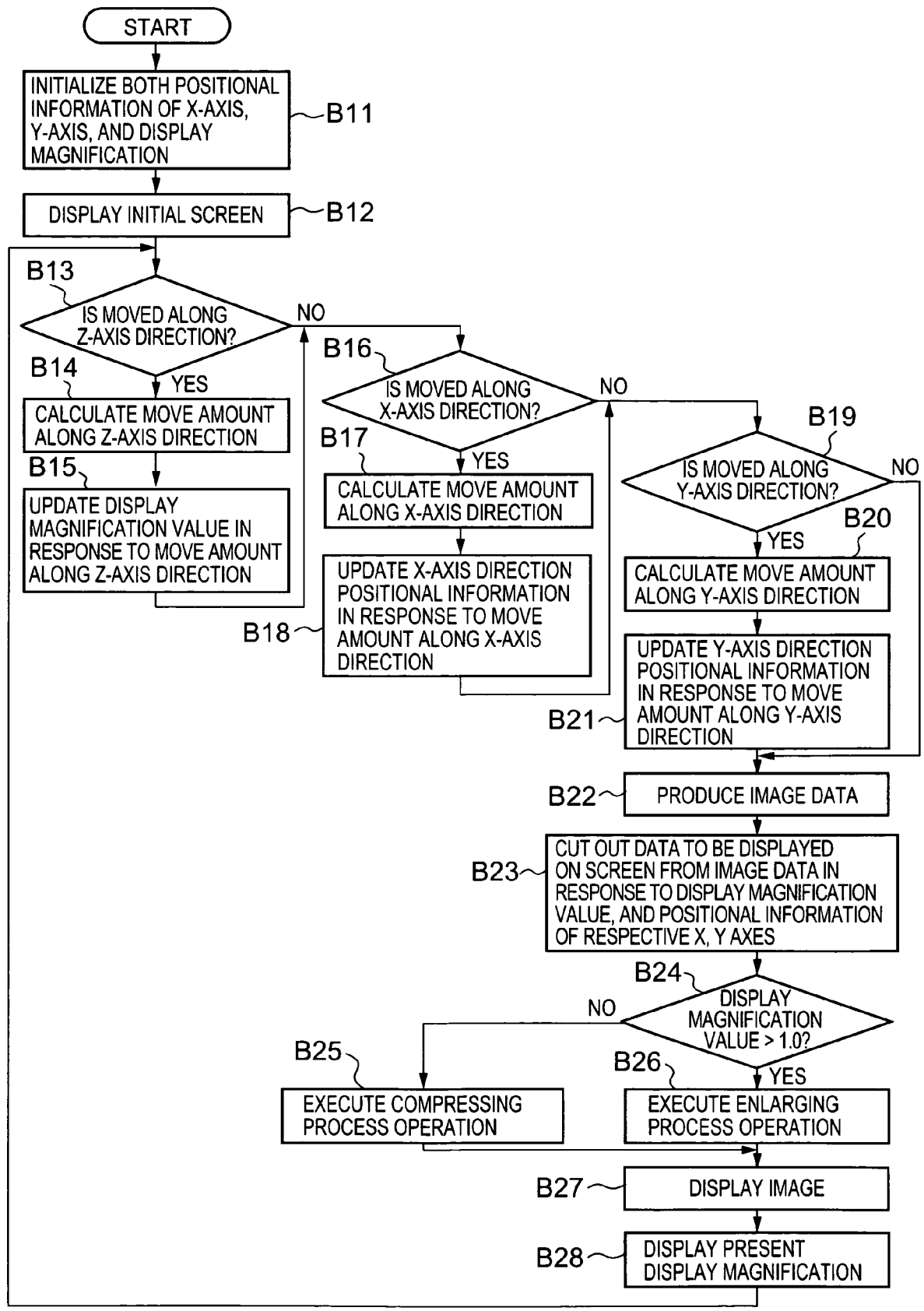
FIG. 14 is a flow chart for describing display process operations of the portable telephone operated in accordance with a second embodiment of the present invention, namely, such a flow chart for indicating a display process flow of image data in the case that the display unit thereof is moved along the Z-axis direction, and another display process flow of image data in the case that the display unit thereof is moved along the X-axis and Y-axis directions.

Next, a description is made of process operations of the portable telephone 10 functioning as a second embodiment mode of the present invention with reference to FIG. 14.

FIG. 14 is a flow chart for describing display process operations of the portable telephone 10 according to the second embodiment of the present invention. This flow chart indicates a display process operation of image data in such a case that the display unit 12 employed in the appliance main body 11 of this portable telephone 10 is moved along the Z-axis direction, and also display process operations of the image data in the case that the display unit 12 is moved along both the X-axis direction and the Y-axis direction. It should also be noted that the respective process operations shown in FIG. 14 are executed in such a manner that the control unit (CPU) 21 employed in the portable telephone 10 reads the program.

It is now assumed that image data which should be displayed on the display unit 12 has been stored in the image storage area 25a of the work memory 25 under such a condition that this image data has been compressed in accordance with a predetermined compression system. This image data contains, for example, an image photographed by the camera 16, an image which has been previously recorded on the recording medium, and further, such an image which has been downloaded from the host computer 30 via the network 29 such as the Internet.

When such an image data is displayed on the display unit 12, the control unit 21 initializes positional information of the respective X axis direction and Y axis direction, which have been stored in the positional information storage area 25d of the work memory 25, and furthermore initializes the display magnification to obtain, for example, "1.0 time (100%)", while this display magnification has been stored in the display magnification storage area 25c of the work memory 25 (step B11).

As previously explained with reference to FIG. 6, the above-described positional information of the respective X axis and Y axis indicate the Y and Y coordinate positions of the center point "O" of the partial image 100 with respect to the entire image 200. Since such an initializing operation is carried out in such a manner that the center point "O" of this partial image 100 is fitted to either a center point of the entire image 200 or any one of four corners of the entire image 200, an image display range is subsequently changed while this position is employed as a reference position.

When the positional information of the respective X axis direction and Y axis direction and also the display magnification are initialized, the control unit 21 expands the image data stored in the image storage area 25*a* of the work memory 25 to the display memory area 25*b* based upon these initialized information, an initial screen of this image data is displayed on the display unit 12 (step B12).

In this stage, after the special display mode is designated by depressing the special display mode button 13*a* provided on the input unit 13 of the portable telephone 10 by the user, when the user moves the display unit 12 provided on the upper surface of the appliance main body 11 along the vertical direction, namely the Z-axis direction with respect to the display screen thereof, this movement the display unit 12 is sensed by the sensor 18 built in the appliance main body 11 ("YES" of step B13). As previously explained, this sensor 18 is arranged by the 3-axial acceleration sensor. When acceleration is applied to this sensor 18 along the Z-axis direction, this sensor 18 A/D-converts such a voltage signal which is produced and is directly proportional to the applied acceleration into a digital voltage signal, and then outputs this digital voltage signal to the control unit 21. When the control unit 21 receives the voltage signal (digital signal) outputted from this sensor 18, the control unit 21 performs the integral calculation process operation as to this digital voltage signal in order to calculate a move amount of the display unit 12 along the Z-axis direction (step B14).

When the move amount of the display unit 12 along the Z-axis direction is obtained, the control unit 21 determines display magnification based upon this move amount, and then updates the display magnification value stored in the display magnification storage area 25*c* (step B15). In this case, while a magnification value per unit move amount has been previously determined, as explained in the first embodiment, assuming now that this parameter value is equal to "α", display magnification "N" along an enlarging direction may be expressed by the following formula:

$N$=move amount×α.

On the other hand, display magnification "M" along a compressing direction may be expressed by the following formula:

$N$=1/$N$=1/(move amount×α).

Also, the user can arbitrarily set the following definitions on a mode setting screen (not shown), namely, one definition is made of "movement along first direction is enlargement, and movement along second direction is compression", and another definition is made of "movement along first direction is compression, and movement along second direction is enlargement." This setting information is stored in the setting information storage area 25*e* of the work memory 25. The control unit 21 calculates either the display magnification "N" of the enlarging direction or the display magnification "M" of the compressing direction based upon the setting information stored in this setting information storage area 25*e*.

Also, when the user moves the display unit 12 provided on the upper plane of the appliance main body 11 along either the X-axis direction or the Y-axis direction, namely the horizontal direction with respect to the display screen thereof, this movement is sensed by the sensor 18 built in the appliance main body 11.

Similar to the display process operation executed while the display unit 12 is moved along the Z-axis direction, if acceleration is applied to the display unit 12 along the X-axis direction, then a voltage signal which is produced and is directly proportional to this applied acceleration is A/D-converted into a digital voltage signal, and then, this digital voltage signal is outputted to the control unit 21. The control unit 21 performs an integral calculation process operation with respect to the voltage signal (digital signal) outputted from this sensor 18, so that the control unit 21 calculates a move amount of the display unit 12 along the X-axis direction (steps B16 and B17). Then, the control unit 12 updates the positional information of the positional information storage area 25*d* along the X-axis direction based upon this calculated move amount (step B18). In other words, the range of the partial image which is displayed on the display unit 12 is shifted from the initial position by the movement along the X-axis direction in connection with the movement of the display unit 12 along the X-axis direction.

The above-described display process operation is executed similar to that of the Y-axis direction. That is, if acceleration is applied to the display unit 12 along the Y-axis direction, then a voltage signal which is produced and is directly proportional to this applied acceleration is A/D-converted into a digital voltage signal, and then, this digital voltage signal is outputted to the control unit 21. The control unit 21 performs an integral calculation process operation with respect to the voltage signal (digital signal) outputted from this sensor 18, so that the control unit 21 calculates a move amount of the display unit 12 along the Y-axis direction (steps B19 and B20). Then, the control unit 12 updates the positional information of the positional information storage area 25*d* along the Y-axis direction based upon this calculated move amount (step B21). In other words, the range of the partial image which is displayed on the display unit 12 is shifted from the initial position by the movement along the Y-axis direction in connection with the movement of the display unit 12 along the Y-axis direction.

Next, the control unit 12 enlarges/compresses this image data based upon the updated display magnification to change the display size, and further, changes the display range based upon the updated positional information as to the X axis direction and the Y axis direction. Similar to the above-explained first embodiment, in this case, the control unit 21 firstly executes such a process operation that, as indicated in FIG. 6, an entire image is expanded to the display memory area 25*b* (step B22).

Then, the control unit 21 cuts out an image portion to be displayed on the screen of the display unit 12 from the entire image based upon the display magnification, and both the positional information of the X axis direction and the Y axis direction (step B23), and also, executes an enlarging/compressing process operation in response to the display magnification value with respect to this cut image data (steps B24 to B26), so that the control unit 21 again displays this image data on the display screen of the display unit 12 (step B27).

Also, the control unit 21 displays the present display magnification in a specific display mode at a predetermined position on the display screen of the display unit 12 (step B28). Concretely speaking, as illustrated in FIG. 11 to FIG. 13, the control unit 21 may display such a numeral value 41, a slide bar 42, or a meter 43, which indicate the present display magnification, on the upper portion of the display screen.

As previously explained, if the display unit 12 is moved along the X-axis direction and the Y-axis direction, then the display ranges of the image data can be dynamically changed in response to the move amounts obtained at this time.

Third Portable Telephone

A portable telephone, according to a third embodiment of the present invention, is featured by that when a specific key input operation is made, image data is returned to an original display condition, namely an initial display condition, and then, the resultant image data is displayed. Concretely speaking, the above-described specific key implies the initializing display mode button 13b which has been allocated to one of the respective buttons of the input unit 13 shown in FIG. 1.

Third Processing Operation of Portable Telephone 10

Figure 15:
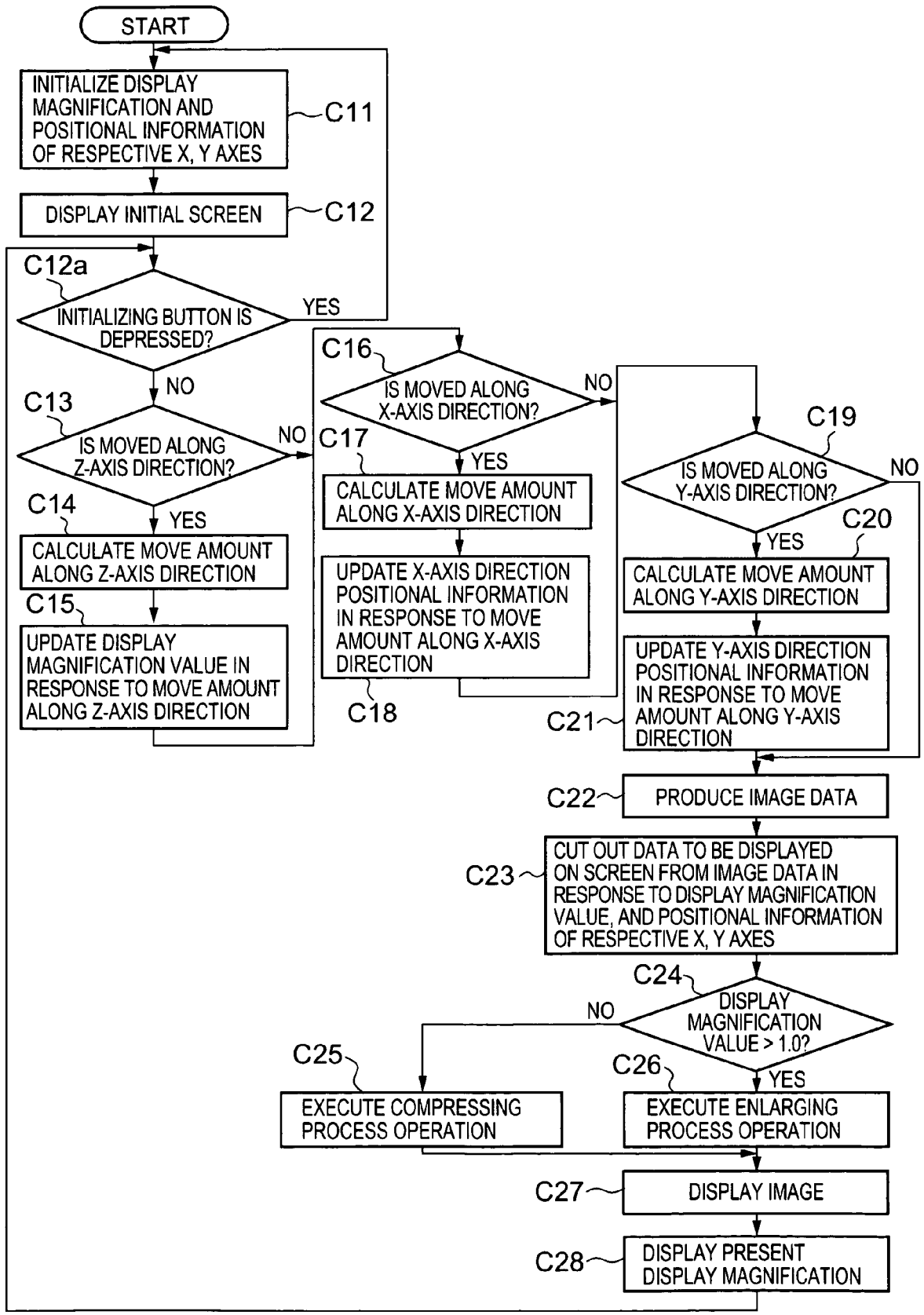
FIG. 15 is a flow chart for describing display process operations of the portable telephone operated in accordance with a third embodiment of the present invention, namely, such a flow chart for representing a display process flow of image data, which contains an initializing process operation executed by depressing an initializing display mode button.

FIG. 15 is a flow chart for describing display process operations of the portable telephone 10 according to the third embodiment of the present invention. This flow chart indicates display process operations of image data, which contain an initialization display process operation executed by depressing the initializing display mode button 13b. It should also be noted that the respective process operations shown in FIG. 15 are executed in such a manner that the control unit (CPU) 21 employed in the portable telephone 10 reads the program.

Basic process flow operations are similar to the process operations as explained in the second embodiment shown in FIG. 14. It should be understood that the respective process operations defined from a step C11 to a step C28 are the same as the process operations defined from the step B11 to the step B28 shown in FIG. 14 except for a step C12a in FIG. 14.

That is, first of all, both the positional information of the respective X-axis direction and Y-axis direction, and also the display magnification are initialized, the control unit 21 expands the image data stored in the image storage area 25a of the work memory 25 to the display memory area 25b based upon these initialized information, an initial screen of this image data is displayed on the display unit 12 (steps C11 and C12).

Then, after the special display mode is designated by depressing the special display mode button 13a provided on the input unit 13 of the portable telephone 10 by the user, when the user moves the display unit 12 provided on the upper surface of the appliance main body 11 along the vertical direction, namely the Z-axis direction with respect to the display screen thereof, the control unit 21 updates the display magnification value in response to a move amount of this display unit 12 along the vertical direction (steps C13 to C15).

On the other hand, when the user moves the display unit 12 along the horizontal direction, namely, the X-axis direction and the Y-axis direction with respect to the display screen, the control unit 21 updates the positional information in response to move amounts along the X-axis direction and the Y-axis direction (steps C16 to C21).

When both the display magnification and the positional information are updated based upon the move direction and the more amount of the display unit 12 in accordance with the above-described manner, the control unit 21 cuts out an image portion to be displayed on the screen of the display unit 12 from the image data (entire image) based upon the above-described information, and also, executes an enlarging/compressing process operation in response to the display magnification value with respect to this cut image data, so that the control unit 21 displays this image data on the display screen of the display unit 12 (steps C22 to C27). Also, at this time, the present display magnification is displayed on a predetermined position of the display screen in a specific display mode (step C28).

In this stage, when the user depresses the initializing display mode button 13b provided on the input unit 13 at arbitrary timing so as to designate the initializing display mode ("YES" in step C12a), both the positional information and the display magnification are initialized, and thus, the initial screen of this image data is displayed on the display unit 12 (steps C11 and C12).

In this case, the initialization of the positional information implies such an initializing operation that the center point "O" of this partial image is fitted to either a center point of the entire image or any one of four corners of the entire image. Also, the above-described initialization of the display magnification implies that the present display magnification is changed to the initial magnification, namely "1.0 time (100%)."

As previously explained, the present display condition can be returned to the original display condition by simply depressing the initializing display mode button 13b.

In this third embodiment, the description has been made as to such a case that the initializing display mode is applied to the display process operations of the second embodiment. Alternatively, this initializing display mode may be similarly applied to the display process operation of the first embodiment. In such a case that the initializing display mode is applied to the display process operation of the first embodiment, the image data may be displayed under such a condition that the display magnification is returned to the original condition in response to the depression of the initializing display mode button 13b.

Also, in the respective embodiments, the display process operations have been explained in such an assumption that the image data is displayed. The information which should be displayed is not limited only to images, but also texts (characters). Furthermore, as images, not only still images but also moving pictures may be alternatively applied to this information to be displayed. In this alternative case, if a scene which is wanted to be enlarged is present in a moving picture under reproduction, then the user moves the display screen along the Z-axis direction at this stage, so that this scene can be displayed in a close-up mode.

As to the images acquired by operating the camera 16, the present invention is not limited only to such a case that such an image which has already been required is displayed, but also may be applied to another case. That is, since the display unit 12 is moved along the Z-axis direction with respect to such an image which should be photographed and is displayed on the display screen of the display unit 12, the display size thereof may be changed (enlarged/compressed). This display unit 12 may function as an electronic view finder during the photographing operation. In other words, a zooming function may be alternatively realized by such an operation that the display unit 12 is moved close to, or remoted from a photographic subject.

Figure 16:
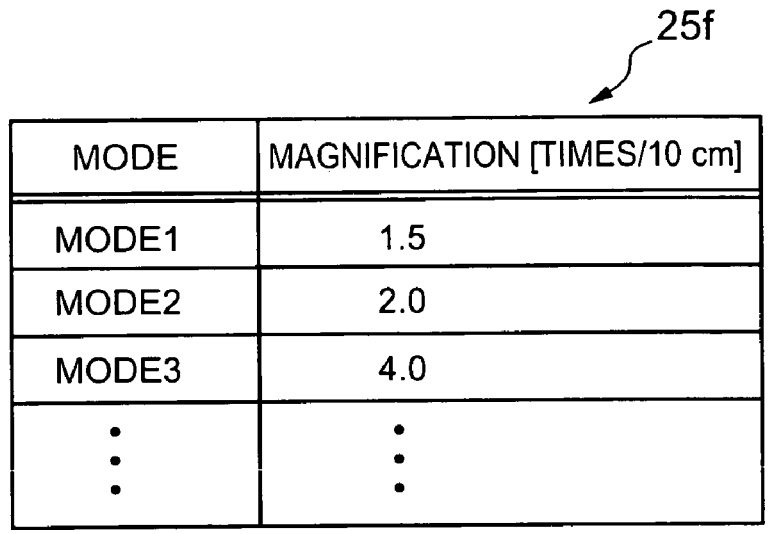
FIG. 16 is a diagram for illustratively showing an example of a magnification table employed in the portable telephone of FIG. 15.

Also, in the respective embodiments, the descriptions have been made of such a condition that the magnification per unit move amount is constant ($\alpha=2.0$ [times/10 cm]). Alternatively, the magnification may be switched every mode by employing, for example, such a magnification table 25f as shown in FIG. 16. It should also be noted that the respective modes involve such modes which may be classified in accordance with a sort of display information, for example, "image display mode" and "text display mode", and further, such modes which may be classified in accordance with a photographing format, for instance, "standard photograph mode"

and "panoramic photograph mode" as to a camera. In the magnification table 25f, magnification values per unit move amount which have been preset every mode have been previously stored.

In the example of FIG. 16, such magnification values have been set in such a manner that a magnification value of 1.5 [times/10 cm] is set to the mode 1; a magnification value of 2.0 [times/10 cm] is set to the mode 2; a magnification value of 4.0 [times/10 cm] is set to the mode 4, and so on. This implies that when the model is initiated, the information displayed on the display screen is enlarged by 1.5 times every time the display unit 12 is moved by the distance of 10 cm along the Z-axis direction. This idea maybe similarly applied to other modes 2, 3, - - - .

It is so assumed that as to the compression display, inverse numbers of these magnification values are employed. That is to say, the compressing process operation is carried out in such a manner that a magnification value of 1/1.5 [times/10 cm] is set to the mode 1; a magnification value of 1/2.0 [times/10 cm] is set to the mode 2; a magnification value of 1/4.0 [times/10 cm] is set to the mode 3, and so on. As previously explained, such a condition as to whether the information under display is enlarged, or compressed in accordance with the Z-axis direction (first direction/second direction) of the display unit 12 may be previously set by the user.

Such a magnification table 25f is provided in a predetermined storage area of the work memory 25. When any one of the above-described modes 1, 2, 3 - - - is initiated, the control unit 21 refers to the magnification table 25f and sets a magnification value which is adapted to this initiated mode. Then, the control unit 21 calculates display magnification based upon this set magnification value and the move amount of the display unit 12 along the Z-axis direction, and enlarges, or compresses such an information which is displayed on the display screen of the display unit 12 based upon the calculated display magnification.

Figure 17:
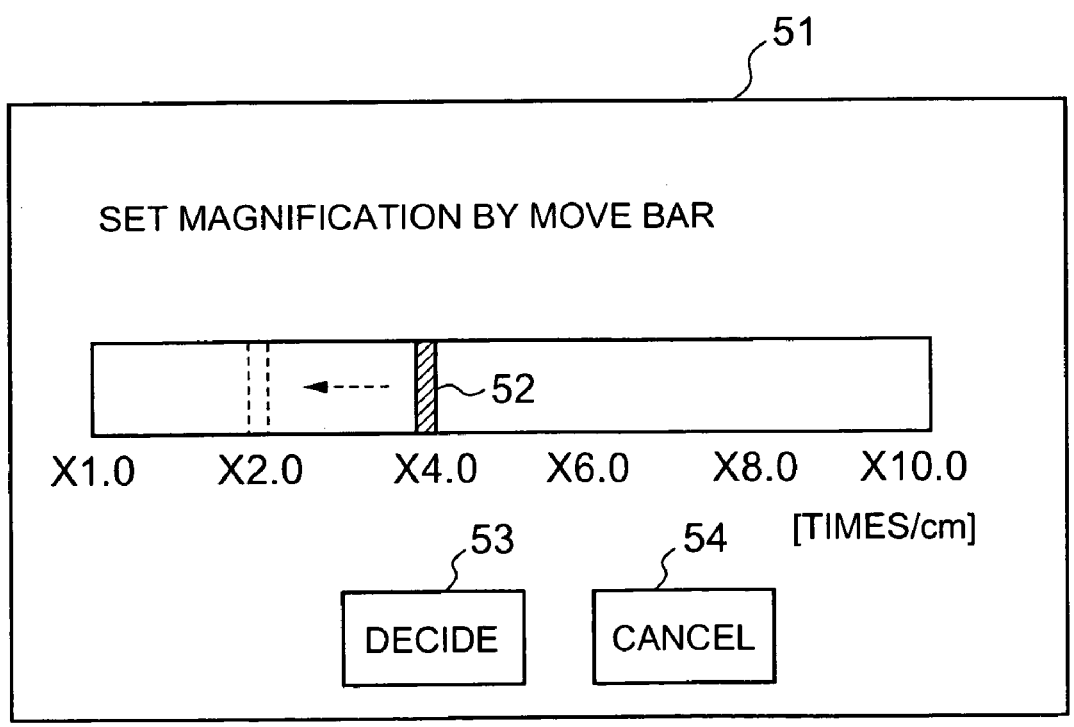
FIG. 17 is a diagram for illustratively showing an example of a magnification setting screen displayed on the display screen of the display unit employed in the portable telephone of FIG. 15.

Also, for instance, the user may arbitrarily set the magnification value by employing such a magnification setting screen 51 as shown in FIG. 17. In this magnification setting screen 51, a magnification changing bar 52, a decision button 53, a cancel button 54, and the like are provided. The user sets a desirable magnification value by such a manner that the user executes a predetermined operation so as to display the magnification setting screen 51, and then, moves the magnification changing bar 52 along right/left directions. When the user depresses the decision button 53, such a magnification value that the magnification changing bar 52 is positioned at this time may be defined, and then, if the user depresses the cancel button 54, this defined magnification value is canceled, so that this canceled magnification value is set to a default value (for example, 1.0).

In the example shown in FIG. 17, a magnification value may be arbitrarily set between 1.0 and 10.0 [times/10 cm]. It is so assumed that as to the compression display, inverse numbers of these magnification values are employed. The magnification value per unit movement which has been set by the user on this magnification setting screen 51 is stored into, for example, the setting information storage area 25e of the work memory 25. The control unit 21 reads out the magnification value set by the user form this setting information storage area 25e, and the control unit 21 calculates display magnification based upon this set magnification value and the move amount of the display unit 12 along the Z-axis direction, and enlarges, or compresses such an information which is displayed on the display screen of the display unit 12 based upon the calculated display magnification.

As previously explained in the second embodiment, in the case that the display range is changed with respect to the movement of the display unit 12 along the X-axis direction and the Y-axis direction, the changing speed at this time may be set based upon the position of the display unit 12 along the Z-axis direction.

In other words, the changing speed (scrolling speed) of the display range is changed, for instance, in the case that the display unit 12 is moved along the X-axis direction and the Y-axis direction (horizontal direction) at such a position where the display unit 12 has been moved from the initial position by a distance of 10 cm along the Z-axis direction (vertical direction), and also, in the case that the display unit 12 is moved along the X-axis direction and the Y-axis direction (horizontal direction) at such a position where the display unit 12 has been moved from the initial position by a distance of 20 cm along the Z-axis direction (vertical direction).

This scrolling speed changing operation may be realized by employing such a method. That is, the control unit 21 calculates a move distance of the display unit 12 along the Z-axis direction while the initial position of this display unit 12 is set as a reference position, and then, calculates a changing speed of the display range with respect to this calculated move distance in accordance with, for example, a predetermined calculation formula. Otherwise, while such a table is prepared into which the changing speeds of the display range with respect to move distances have been previously. set, the control unit 21 may read the relevant changing speed from this table. Subsequently, the control unit 21 may change the display range based upon this set changing speed in connection with the movement of the display unit 12 along the X-axis direction and the Y-axis direction (horizontal direction).

Fourth Portable Telephone

Next, a fourth embodiment mode of the present invention will be described.

In the above-explained fourth embodiment mode, while a portable telephone 100 is further equipped with a "magnifying-glass operation button", a so-called "magnifying-glass display operation" as explained in the first to the third embodiments is carried out only in such a case that a user moves the portable telephone 100 while this "magnifying-glass operation button" is depressed by this user.

Figure 18:
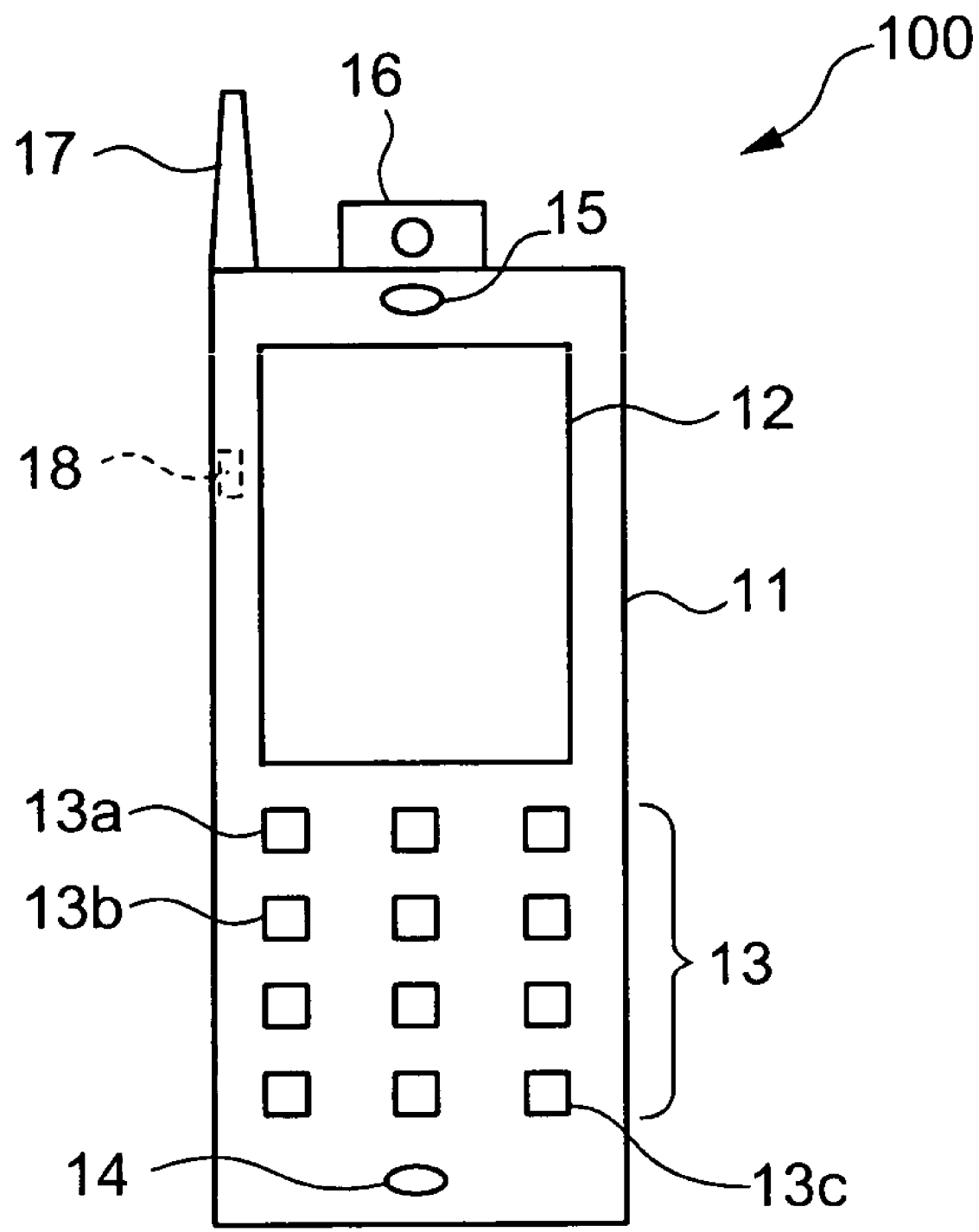
FIG. 18 is a diagram for indicating an outer construction in the case that a portable telephone is exemplified as an electronic appliance according to either a fourth embodiment or a seventh embodiment of the present invention.

FIG. 18 is a diagram for schematically showing an outer structure in the case that a portable telephone 100 is exemplified as the electronic appliance of the present invention. It should be understood that since the portable telephone 100 of this drawing owns structural elements which are commonly used in the above-described portable telephone 10 of FIG. 1, the same reference numerals shown in FIG. 1 will be employed as those for denoting these commonly-used structural elements, and descriptions thereof are omitted.

In this portable telephone 100 of FIG. 18, a magnifying-glass operation button 13c is provided in addition to the portable telephone 10 of FIG. 1. This magnifying-glass operation button 13c may be commonly used as any one of the previously provided buttons on the portable telephone 10 of FIG. 1. Alternatively, a new button may be separately provided as this magnifying-glass operation button 13c. In the case that such a button which has been already provided on the portable telephone 10 is utilized, for example, the button of dial "0", or another button may be operated as the "magnifying-glass operation button" of the present invention.

It should also be noted that since a circuit arrangement of the portable telephone 100 according to this fourth embodiment is similar to that shown in FIG. 4, explanations thereof are omitted.

Fourth Processing Operation of Portable Telephone 100

Figure 19:
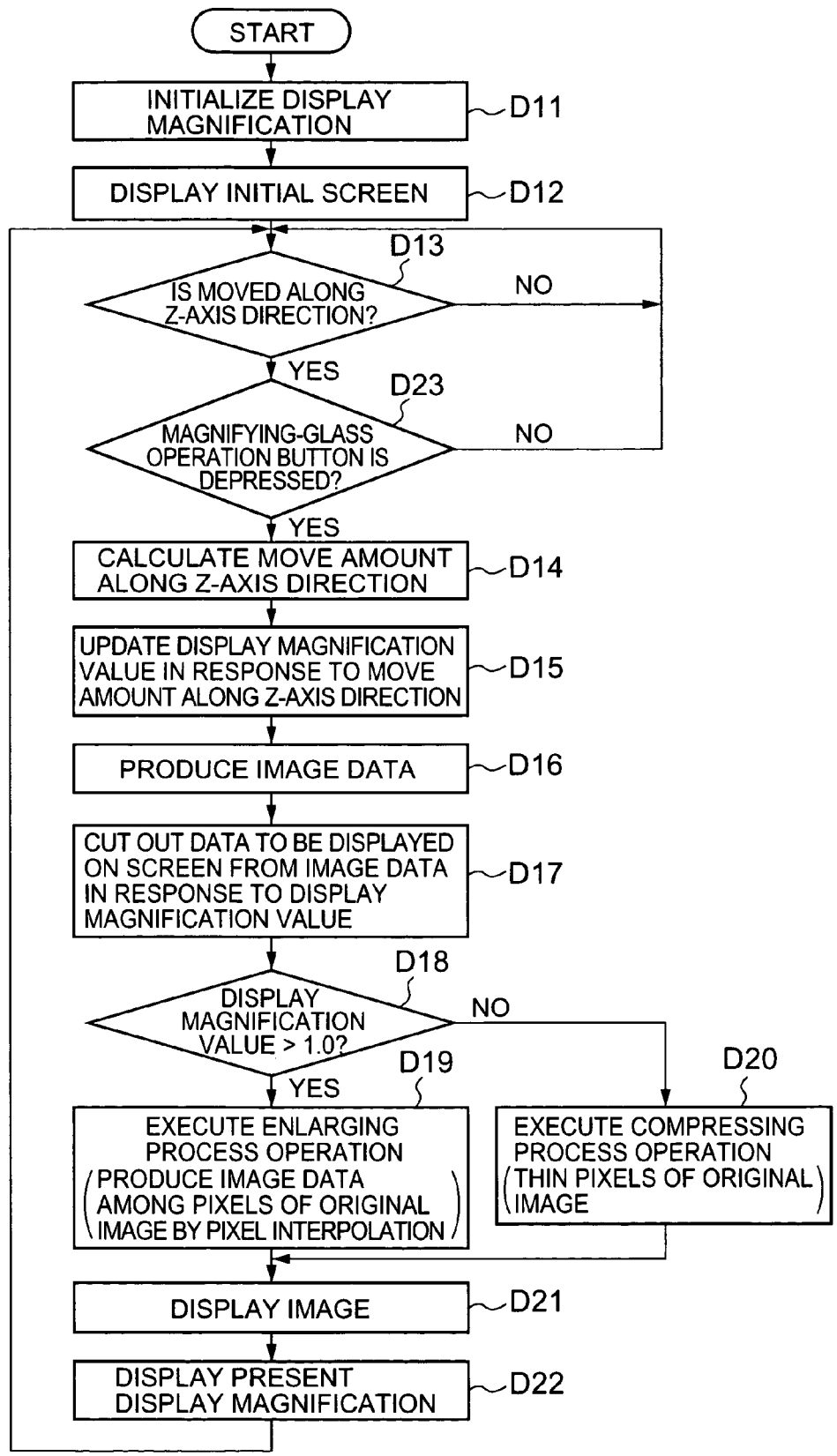
FIG. 19 is a flow chart for describing display process operations of the portable telephone operated in accordance with the fourth embodiment of the present invention, namely, such a flow chart for representing a display process flow of image data, which contains an operation control process executed by depressing a magnifying-glass operation button.

Next, a description is made of process operations of the portable telephone 100 functioning as the fourth embodiment mode of the present invention with reference to FIG. 19.

FIG. 19 is a flow chart for describing display process operations of the portable telephone 100 according to the fourth embodiment of the present invention. This flow chart indicates display process operation of image data in such a case that the display unit 12 employed in the appliance main body 11 of this portable telephone 100 is moved along the Z-axis direction. It should also be noted that the respective process operations shown in FIG. 19 are executed in such a manner that the control unit (CPU) 21 employed in the portable telephone 100 reads the program.

It is should be noted that the operation flow chart of FIG. 19 is substantially similar to the operation flow chart of the portable telephone 10 according to the first embodiment of the present invention. That is, steps D11, D12, - - -, D22 of FIG. 19 correspond to the above-described steps A11, A12, - - -, A22 of FIG. 7, respectively.

In the flow chart shown in FIG. 19, a step D23 is newly added. That is, in a step D13, in the case that the sensor 18 senses such an operation that the appliance main body 11 is moved along the vertical direction, namely the Z-axis direction with respect to the display screen of the display unit 12 ("YES" in step D13), the control unit 21 judges as to whether or not the magnifying-glass operation button 13c is depressed in this step D23.

Then, only in such a case that the control unit 21 judges that the magnifying-glass operation button 13a is depressed in the step D23, the process operation is advanced to the next step D14. In this step D14, such a magnifying-glass display operation similar to that of the flow chart of FIG. 7 is carried out. On the other hand, in such a case that the control unit 21 judges that the magnifying-glass operation button 13c is not depressed in the step D23, the process operation is returned to the previous step D13 even when the appliance main body 11 is moved along the vertical direction with respect to the display screen.

It should also be understood that in this fourth embodiment, such a control operation of the flow chart shown in FIG. 7 has been described. That is, the sensing operation of the movement along the Z-axis direction has been controlled by operating the magnifying-glass operation button 13c. Alternatively, the operation control by the magnifying-glass operation button 13c may be added to the flow charts shown in FIG. 14 and FIG. 15. In this alternative case, a judging step for "judging as to whether or not the magnifying-glass operation button is depressed" similar to the step D23 may be additionally employed.

Fifth Portable Telephone

Next, a fifth embodiment mode of the present invention will be described.

In this fifth embodiment mode, while a portable telephone 10 is moved along the Z-axis direction, a so-called "magnifying-glass display operation" is not carried out in response to slight movement thereof, and a so-termed "play" is provided. Also, in this fifth embodiment, in such a case that the portable telephone 10 is once started to be moved, even when this movement is stopped at an instantaneous time, the magnifying-glass display operation may be continuously carried out.

Fifth Processing Operation of Portable Telephone 10

Figure 20:
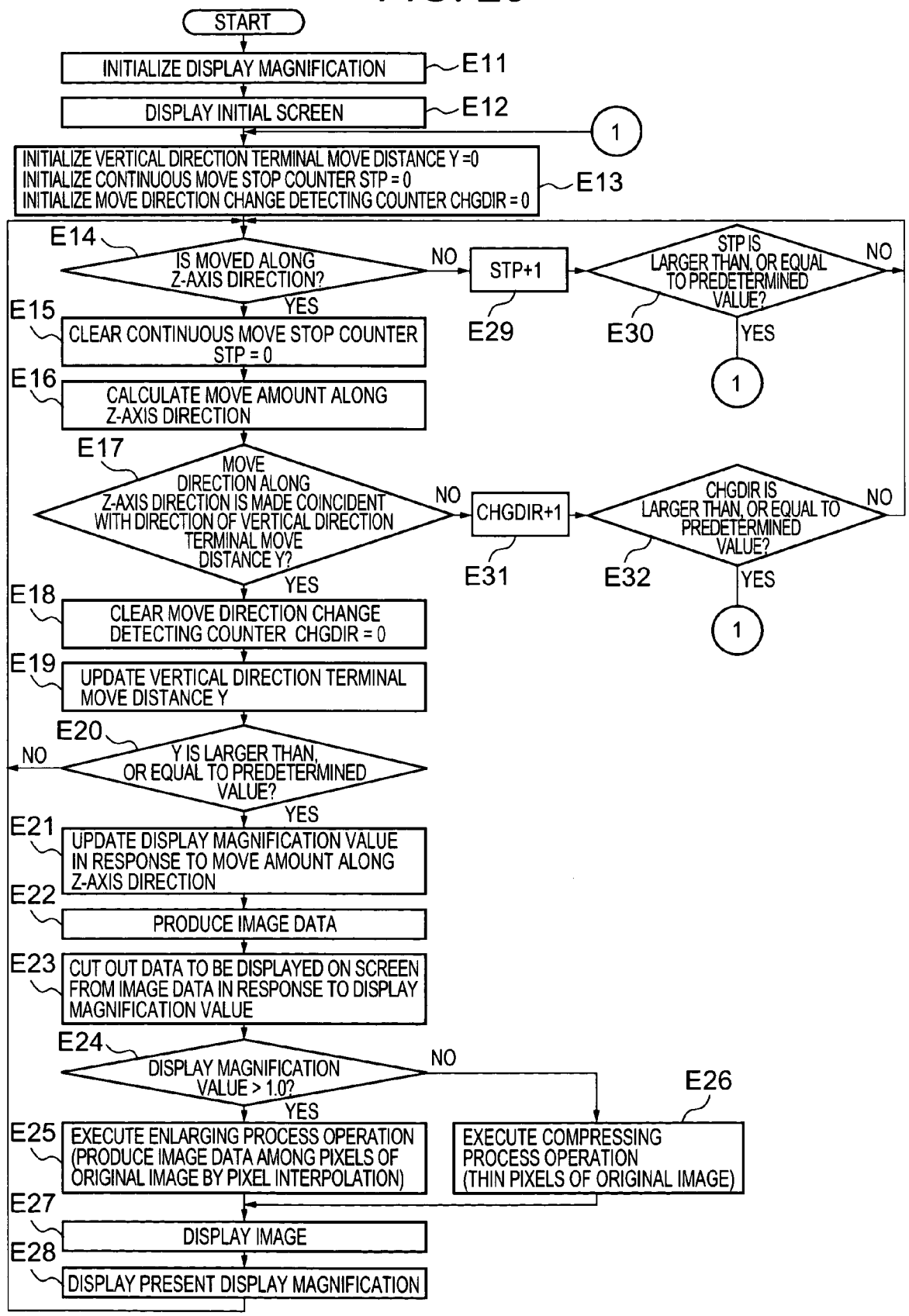
FIG. 20 is a flow chart for describing display process operations of the portable telephone operated in accordance with a fifth embodiment of the present invention, namely, such a flow chart for representing a display process flow of image data, which contains a control process operation for weakening an adaptability of display enlarging/compressing process operation with respect to movement of an appliance main body 11.

FIG. 20 is a flow chart for describing display process operations of the portable telephone 10 according to the fifth embodiment of the present invention. It should also be noted that the respective process operations shown in FIG. 20 are executed in such a manner that the control unit (CPU) 21 employed in the portable telephone 10 reads the program.

Similar to the above-described steps A11 and A12 of FIG. 7, first of all, the control unit 21 initializes the display magnification to obtain, for example, "1.0 time (100%)", while this display magnification has been stored in the display magnification storage area 25c of the work memory 25 (step E11). Since the control unit 21 expands the image data stored in the image storage area 25a of the work memory 25 to the display memory area 25b based upon this initialized magnification (100%), an initial screen of this image data is displayed on the display unit 12 (step E12).

In this fifth embodiment, the work memory 25 further contains the respective memory areas, namely, a vertical direction terminal move distance "Y"; a continuous movement stop counter "STP"; and a move direction change detecting counter "CHGDIR." Then, as to these storage areas, the control unit 21 performs initializing operations in such a manner that the vertical direction terminal move distance Y=0; the continuous movement stop counter STP=0; and the move direction change detecting counter CHGDIR=0 (step E13).

After the above-described initializing process operation is executed, the process operation of the control unit 21 is advanced to a main process loop defined after a step E14.

Firstly, when the user moves the display unit 12 provided on the upper surface of the appliance main body 11 along the vertical direction, namely the Z-axis direction with respect to the display screen thereof, this movement of the display unit 12 is sensed by the sensor 18 built in the appliance main body 11 ("YES" of step E14) Then, when the movement of the appliance main body 11 along the Z-axis direction is detected, first of all, the control unit 21 clears the storage content by writing "0" into the continuous movement stop counter STP (step E15) A detailed operation as to this continuous movement stop counter STP will be explained in the below-mentioned steps E29 to E30.

Then, as previously described in the previous step A14, when the control unit 21 receives the voltage signal (digital signal) outputted from the 3-axial acceleration sensor 18, the control unit 21 performs the integral calculation process operation as to this digital voltage signal in order to calculate a move amount of the display unit 12 along the Z-axis direction (step E16).

When the move amount of the display unit 12 along the Z-axis direction is calculated, the control unit 21 compares a move direction of the move amount along the Z-axis direction, which has been presently detected, with a direction of a vertical direction terminal move distance "Y" (step E17). In this case, the vertical direction terminal move distance "Y" corresponds to such a storage area which will be calculated in the below-mentioned step E19, into which an accumulated move distance is stored. This accumulated move distance is defined from such a condition that the appliance main body 11 is stopped until such a condition that the appliance main body 11 is moved along the Z-axis direction. As a consequence, in the step E17, the control unit 21 judges as to whether or not the appliance main body 11 is continuously moved along the same direction as the move direction defined just before the appliance main body 11 has been moved.

Then, in such a case that the control unit 21 judges that the move direction of the move amount along the Z-axis direction which is presently detected is made coincident with the direction of the vertical direction terminal move distance Y ("YES" in step E17), namely, judges that the appliance main body 11 is continuously moved along the same direction as the move direction defined just before the appliance main body 11 has been moved, the control unit 21 clears the storage by writing "0" into the move direction change detecting counter CHGDIR (step E18). A detailed content of this move direction change detecting counter CHGDIR will be explained in the below-mentioned step E31 to step E32.

In the case that the move amount of the display unit 12 along the Z-axis direction is acquired, and the control unit 21 judges that the move direction of the appliance main body 11 corresponds to the same move direction as the move direction defined just before, the control unit 21 updates the vertical direction terminal move distance Y by adding the presently detected move amount of the Z-axis direction to this vertical direction terminal distance Y (step E19). Since such a process operation is carried out, such an accumulated distance is stored in the storage area of the vertical direction terminal move distance Y, while this accumulated distance represents that after the appliance main body 11 which has stopped is started to be moved, how long this appliance main body 11 is moved along the Z-axis direction.

In a step E20, the control unit 21 judges as to whether or not the vertical direction terminal move distance Y becomes longer than, or equal to a predetermined value. In other words, the control unit 21 judges as to whether or not the move distance along the Z-axis direction since the stopped appliance main body 11 has commenced to move becomes longer than, or equal to the previously set value. Then, when the vertical direction terminal move distance Y is not longer than, or equal to the predetermined value, the process operation is returned to the step E14 without any enlarging/compressing process ("NO" in step E20). Since the above-described process operation is carried out, the display enlarging/compressing process operation is not carried out while the move distance of the appliance main body 11 is short, so that a blank section of the operation corresponding to a so-called "play" can be formed.

On the other hand, in such a case that the vertical direction terminal move distance Y becomes longer than, or equal to the predetermined value, the process operation is advanced to a process operation subsequent to the step E21, in which a display enlarging/compressing operation is carried out. The control unit 21 updates the display magnification value in response to the move amount of the appliance main body 11 along the Z-axis direction in a similar manner as explained in the step A15 (step E21). In this case, the judgement as to whether the image data is displayed in the enlarge mode, or the compression mode; the decision as to whether or not the display unit 12 is moved along which direction of the Z-axis direction; and the decision for setting that the user moves the display unit along which direction are similar to those as previously explained in the step A15. Therefore, explanations thereof are omitted.

Next, the control unit 12 enlarges/compresses this image data based upon the updated display magnification to change the display size. In this case, the control unit 21 firstly executes such a process operation that, as indicated in FIG. 6, an entire image is expanded to the display memory area 25b (step E22). Then, the control unit 21 cuts out an image portion to be displayed on the screen of the display unit 12 from this entire image in response to the display magnification value (step E23), and then, executes the enlarging/compressing process operation in response to the display magnification value (step E24 to step E26). Then, the control unit 21 displays an image (step E27), and further, displays the present display magnification in response to a request (step E28). Since these process operations defined from the step E22 to E28 are similar to the process operations defined from the step A16 to the step A22 in FIG. 7, which have been described in detail in the first embodiment of the present invention, descriptions thereof are omitted in this fifth embodiment.

Returning back to the step E14, in such a case that the movement along the Z-axis direction is not detected ("NO" in step E14), the continuous move stop counter STP is incremented. This counter STP is cleared to zero in the step E15 when the movement along the Z-axis direction is detected in the step E14. When the movement along the Z-axis direction is stopped, this counter STP is counted up by +1 every 1 loop.

Subsequently, the control unit 21 judges as to whether or not the continuous move stop counter STP is larger than, or equal to a predetermined value. In other words, the control unit 21 judges as to whether or not a preselected time duration has elapsed after the movement along the Z-axis direction has stopped. Then, the control unit 21 judges that the predetermined time duration has elapsed ("YES" in step E30), the process operation is advanced to a step E13 in which the control unit 21 clears the vertical direction terminal distance Y, the continuous move stop counter STP, and the move direction change detecting counter CHGDIR, respectively. As a consequence, in order to again perform the magnifying-glass display operation, the vertical direction terminal distance Y must become longer than, or equal to the predetermined value (step E20), so that the present operation mode is switched to a so-called "display fixed mode" under which the magnifying-glass display operation is not carried out by that the display unit 12 is slightly moved.

On the other hand, until the continuous move stop counter STP becomes the preselected value, the switching operation to such a "display fixed mode" is not carried out. In other words, even in such a case that the control unit 21 once judges no movement along the Z-axis direction in the step E14 and this counter STP is counted up, if the sensor 18 again senses the movement along the Z-axis direction at the process timing of a step E15 just after the above-described step E14, then the counter STP is cleared to zero in this step E15, so that the magnifying-glass display operation may be subsequently continued.

Returning back to the previous step E17, in the case that the control unit 21 judges that the movement direction of the move amount along the Z-axis direction, which is presently detected, is made different from the direction of the vertical direction terminal move distance Y, the control unit 21 increments the move direction change detection counter CHGDIR in a step E31. In other words, in the step E17, for example, in such a case that the user starts to move the appliance main body 11 along the lower direction from such a condition that this appliance main body 11 is stopped, the control unit 21 may judge as to whether the user continuously moves this appliance main body 11 along the same direction (namely, lower direction in this case), or the user moves this appliance main body 11 along the different direction (namely, upper direction in this case). Then, when the control unit 21 judges that the appliance main body 21 is moved along the different direction (namely, upper direction), i.e., "NO" in step E17, the control unit 21 counts up the move direction change detecting counter CHGDIR.

Then, the control unit 21 judges as to whether or not the move direction change detecting counter CHGDIR becomes larger than, or equal to a predetermined value in a step E32. In other words, when the appliance main body 11 starts to be moved along the opposite direction and then a predetermined time duration has elapsed, the move direction change detecting counter CHGDIR becomes larger than, or equal to a predetermined value, so that the process operation jumps to the step E13 ("YES" in step E32). On the other hand, in such a case that after the appliance main body 11 has been moved along the opposite direction only for one moment, this appliance main body 11 is again moved along the original direction, the move direction change detecting counter CHGDIR is cleared to zero in a step E18. As a result, the magnifying-glass display operation may be continuously carried out.

Sixth Portable Telephone

Next, a sixth embodiment mode of the present invention will be described.

In this sixth embodiment mode, an enlarging/compressing operation is not carried out in response to a move distance of the appliance main body 11, but a predetermined display enlarging/compressing operation is carried out when the appliance main body 11 is "swung" one time while the user holds this appliance main body 11.

Sixth Processing Operation of Portable Telephone 10

Figure 21:
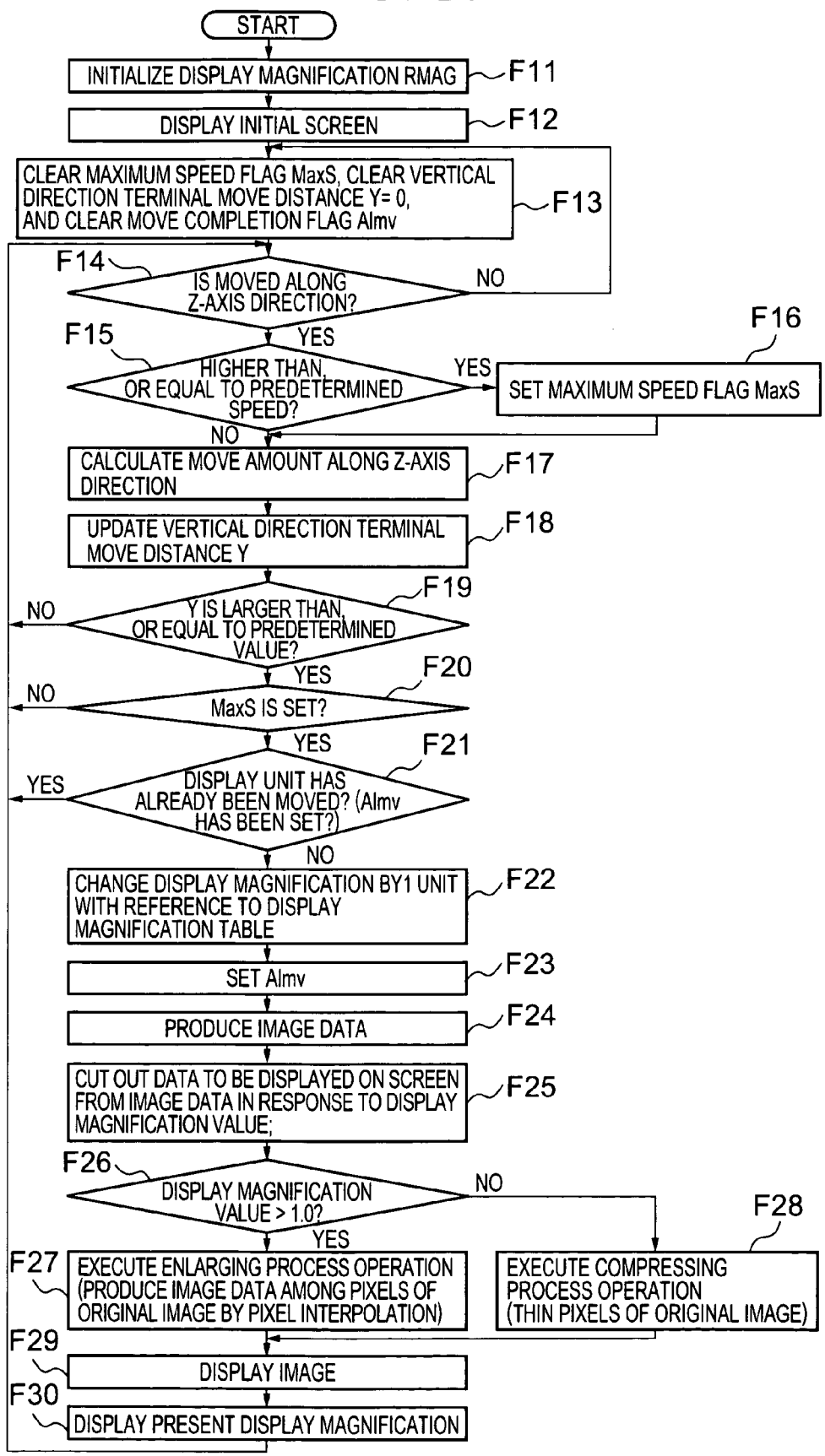
FIG. 21 is a flow chart for describing display process operations of the portable telephone operated in accordance with a sixth embodiment of the present invention, namely, such a flow chart for representing a display process flow of image data, which contains a display control process operation for enlarging/compressing a display content every time the appliance main body 11 is swung.

FIG. 21 is a flow chart for describing concrete display enlarging/compressing operations of the portable telephone 10 according to the sixth embodiment of the present invention. It should also be noted that the respective process operations shown in FIG. 21 are executed in such a manner that the control unit (CPU) 21 employed in the portable telephone 10 reads the program.

Similar to the above-described steps A11 to A12 of FIG. 7, first of all, the control unit 21 initializes the display magnification to obtain, for example, "1.0 time (100%)", while this display magnification has been stored in the display magnification storage area 25c of the work memory 25 (step F11). Since the control unit 21 expands the image data stored in the image storage area 25a of the work memory 25 to the display memory area 25b based upon this initialized magnification (100%), an initial screen of this image data is displayed on the display unit 12 (step F12).

In this sixth embodiment, the work memory 25 further owns the respective memory areas, namely, a memory area for storing a maximum speed flag "MaxS"; a memory area for storing a vertical direction terminal move distance "Y"; and a memory area for storing a move completion flag "Almv." Then, the control unit 21 initializes the contents of these storage areas, namely clears both the maximum speed flag MaxS and the move completion flag Almv, and also, sets the vertical direction terminal move distance Y=0 (step F13).

When these initializing operations are accomplished, the process operation by the control unit 21 is advanced to a main process loop subsequent to a step F14.

Firstly, when the user moves the display unit 12 provided on the upper surface of the appliance main body 11 along the vertical direction, namely the Z-axis direction with respect to the display screen thereof, this movement of the display unit 12 is sensed by the sensor 18 built in the appliance main body 11 ("YES" of step F14). It should be noted that when the sensor 18 does not sense the movement of the appliance main body 11 in the step F14 ("NO" in step F14), the control unit 21 judges that a series of movement of the appliance main body 11 by the user is accomplished, the control unit 21 executes initializing process operation as to the respective flags.

When the movement along the Z-axis direction is sensed., the control unit 21 judges as to whether or not a speed of the sensed movement becomes a predetermined speed (step F15) When the speed of the sensed movement is higher than, or equal to the predetermined speed, the control unit 21 sets the maximum speed flag MaxS (step F16). When the movement of the appliance main body 11 along the Z-axis direction is not sensed in the step F14, this maximum speed flag MaxS is cleared by the control unit 21 in the step F13. As a consequence, this maximum speed flag MaxS corresponds to such a flag which indicates as to whether or not a speed of movement of the appliance main body 11 is reached to the predetermined speed value even at an instantaneous time while this appliance main body 11 is once started to be moved and then is continuously moved. In other words, the maximum speed flag MaxS may imply such a flag for indicating as to whether or not an instantaneous maximum speed achieved while the appliance main body 11 is continuously moved one time is reached to a predetermined threshold value.

Next, as previously explained in the previous step A14, when the control unit 21 receives the voltage signal (digital signal) outputted from this 3-axial acceleration sensor 18, the control unit 21 performs the integral calculation process operation as to this digital voltage signal in order to calculate a move amount of the display unit 12 along the Z-axis direction (step F17). Then, the control unit 21 adds the move amount along the Z-axis direction, which is presently detected, to the vertical direction terminal move distance Y so as to update the vertical direction terminal move distance Y (step F18).

When the movement along the Z-axis direction is detected in accordance with the above-explained manner, the control unit 21 judge as to whether or not the vertical direction terminal move distance Y is reached to a predetermined distance (step F19). Also, the control unit 21 judges as to whether or not an instantaneous maximum speed achieved during a series of moving operations is reached to a predetermined threshold value by referring to the maximum speed flag MaxS (step F20). In other words, the control unit 21 judges as to whether or not a user swings the appliance main body 11 one time while the user holds this appliance main body 11. Then, in such a case that the control unit 21 judges that the appliance main body 11 is swung by executing a series of these judging operation ("YES" in step F20). Furthermore, the control unit 21 confirms that the display enlarging/compressing operation has not already been carried out based upon a series of the present moving operations with reference to the move completion flag Almv (step F21).

In the case that the control unit 21 judges that the display enlarging/compressing operation has not already been carried out based upon a series of the present moving operations ("NO" in step F21), the control unit 21 changes the display magnification by employing a display magnification table.

In this connection, an example of the display magnification table is shown in FIG. 22.

The display magnification table of FIG. 22 corresponds to such a table for storing thereinto sets of display magnification unit numbers and actual display magnification values. In the display magnification changing process operation of a step F22, in such a case that the present display magnification is such a display magnification that, for example, the display magnification unit number "0"=actual display magnification 100%, the control unit 21 executes the display magnification changing process operation in such a manner that this display magnification unit number "0" is enlarged by 1 unit, and therefore, is updated to become another display magnification unit number "+1"=actual display magnification "150%."

In this case, such a designation may be made by that such a condition as to whether the image data is displayed by being enlarged, or by being compressed may be determined by that the display unit 12 is moved along which direction of the Z axis. For instance, in such a case that the appliance main body 11 is swung along such a direction directed from the front surface of the display unit 12 to the rear surface thereof (in general-purpose portable telephone, lower direction), the control unit 21 enlarges the display content. To the contrary, in such a case that the appliance main body 11 is swung along such a direction directed from the rear surface of the display unit 11 to the front surface thereof (in general-purpose portable telephone, upper direction), the control unit 21 compresses the display content.

Alternatively, while such a "magnifying-glass operation button" as explained in the fourth embodiment is provided on the appliance main body 11, a so-called "magnifying-glass enlarging/compressing display operation" may be realized by combining the magnifying-glass operation button with this sixth embodiment. In other words, only when the appliance main body 11 is swung under such a condition that the magnifying-glass operation button 13c is depressed, the magnifying-glass enlarging/compressing display operation of this sixth embodiment may be carried out.

In such an alternative construction, while two sets of the magnifying-glass operation buttons are employed, one operation button may be used as an enlarge-purpose magnifying-glass operation button, whereas the other operation button may be used as a compress-purpose magnifying-glass operation button. In this case, when the appliance main body 11 is moved over a distance longer than, or equal to a predetermined distance at a maximum speed higher than, or equal to the predetermined threshold speed, irrespective of a direction of movement of the appliance main body 11 along the Z-axis direction, in such a case that the appliance main body 11 is moved while the enlarge-purpose magnifying-glass operation button is depressed, the control unit 21 enlarges the display content, whereas in such a case that the appliance main body 11 is moved while the compress-purpose magnifying-glass operation button is depressed, the control unit 21 compresses the display content.

Then, since the display magnification changing process operation is carried out only one time by such an action that a series of operations is performed, namely, the appliance main body 11 is swung only one time, the control unit 21 sets the move completion flag Almv in a step F23.

Next, the control unit 12 enlarges/compresses this image data based upon the updated display magnification to change the display size. In this case, the control unit 21 firstly executes such a process operation that, as indicated in FIG. 6, an entire image is expanded to the display memory area 25b (step F24). Then, the control unit 21 cuts out an image portion to be displayed on the screen of the display unit 12 from this entire image in response to the display magnification value (step F25), and then, executes the enlarging/compressing process operation in response to the display magnification value (step F26 to step F28). Then, the control unit 21 displays an image (step F29), and further, displays the present display magnification in response to a request (step F30). Since these process operations defined from the step F24 to F30 are similar to the process operations defined from the step A16 to the step A22 in FIG. 7, which have been described in detail in the first embodiment of the present invention, descriptions thereof are omitted in this sixth embodiment.

Since the above-described process operation is carried out, when the user swings the appliance main body 11 one time while the user holds this appliance main body 11, the control unit 21 can perform the display enlarging/compressing operations in accordance with the predetermined sequence.

It should also be understood that in this sixth embodiment, the control unit 21 executes the enlarging/compressing operations with employment of the display magnification table shown in FIG. 22. However, the present invention is not limited only to this example. Alternatively, for example, while such a table is not employed, the display magnification may be enlarged/compressed only a predetermined ratio. That is, when the appliance main body 11 is swung one time by the user, in the enlargement case, the display magnification may be changed by, for instance, +50%, whereas in the compression case, the display magnification may be changed by, for instance, −25%.

Seventh Portable Telephone

Next, a seventh embodiment mode of the present invention will be described.

Similar to the above-explained fourth embodiment mode, a portable telephone 100 is further equipped with a "magnifying-glass operation button" in this seventh embodiment. As a result, a diagram for showing an outer structure of the portable telephone 100 is similar to the diagram shown in FIG. 18.

In the respective embodiments of the present invention, in such a case that the appliance main body 11 of the portable telephone 10 is moved along the Z-axis direction, the magnifying-glass display operation could be realized in such a manner that the image data is displayed by such a display magnification defined in response to the move distance.

In contrast to the above-explained embodiments, in accordance with this seventh embodiment of the present invention, when the portable telephone 100 is moved along the Z-axis direction, display magnification is enlarged at a speed in response to this move distance.

In other words, for example, in the case of the above-described first embodiment, when the appliance main body 11 of the portable telephone 10 is moved to the lower direction along the Z-axis direction, the display magnification is enlarged in response to the move distance. When the portable telephone 10 is stopped at the lower position, the display is stopped in this present display magnification. In contrast, in the case of this seventh embodiment, when the appliance main body 11 of the portable telephone 100 is moved to the lower direction along the Z-axis direction, an enlarging speed of the display magnification is gradually increased. When the portable telephone 100 is stopped at the lower position, the display is continuously enlarged at a speed corresponding to this position.

Seventh Processing Operation of Portable Telephone 100

Figure 23:
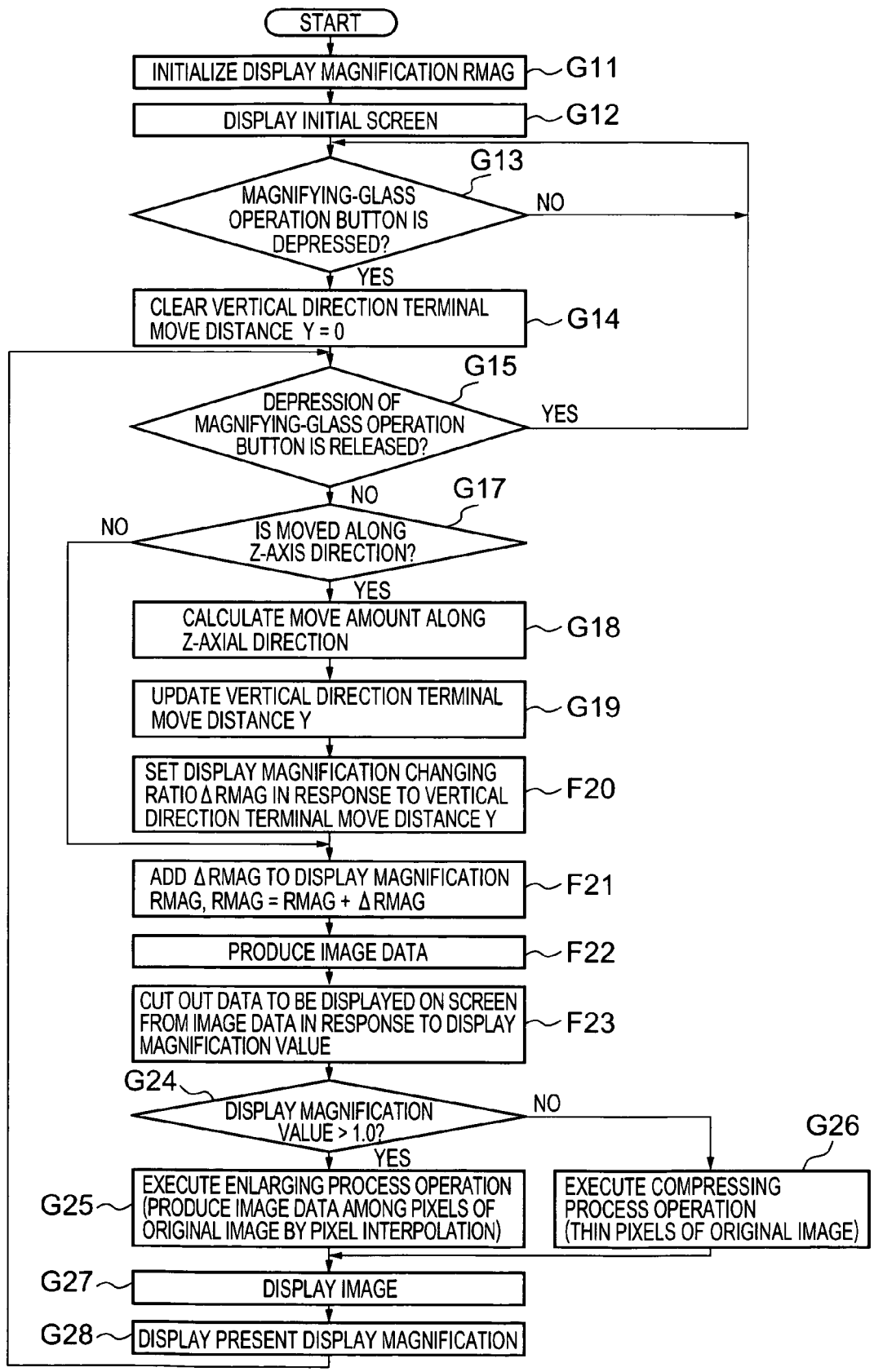
FIG. 23 is a flow chart for describing display process operations of the portable telephone operated in accordance with a seventh embodiment of the present invention, namely, such a flow chart for showing a display process flow of image data, which contains a display control process operation for enlarging/compressing a display in response to a move distance of the appliance main body 11.

FIG. 23 is a flow chart for describing display process operations of the portable telephone 100 according to the seventh embodiment of the present invention. It should also be noted that the respective process operations shown in FIG. 23 are executed in such a manner that the control unit (CPU) 21 employed in the portable telephone 100 reads the program.

Similar to the above-described steps A11 and A12 of FIG. 7, first of all, the control unit 21 initializes the display magnification to obtain, for example, "1.0 time (100%)", while this display magnification has been stored in the display magnification storage area 25c of the work memory 25 (step G11). Since the control unit 21 expands the image data stored in the image storage area 25a of the work memory 25 to the display memory area 25b based upon this initialized magnification (100%), an initial screen of this image data is displayed on the display unit 12 (step G12). In this seventh embodiment, for the sake of easy explanations, the display magnification storage area 25c will be explained based upon such a variable as a variable name "RMAG."

After the above-described initializing process operation is executed, the process operation of the control unit 21 is advanced to a main process loop defined after a step G13.

Since the magnifying-glass operation button 13c is employed in this seventh embodiment similar to the fourth embodiment, the control unit 21 firstly judges as to whether or not the magnifying-glass operation button 13c is depressed in a step G14. The process operation defined in the step G13 is looped until the magnifying-glass operation button 13c is depressed ("NO" in step G13).

When the magnifying-glass operation button 13c is depressed ("YES" in step G13), the control unit 21 writes "0" into the vertical direction terminal move distance Y so as to clear this move distance Y (step G14). As a consequence, while the position where the magnifying-glass operation button 13c is depressed is employed as a reference, the control unit 21 can enlarge a display content at such a speed in response to the move distance Y from this reference position.

In the next step G15, in order that the process operation is escaped from the loop in the case that the depression of the magnifying-glass operation button is released, the control unit 21 judges as to whether or not the depression of the magnifying-glass operation button 13c is released. When the depression of the magnifying-glass operation button 13c is released ("YES" in step G15), the process operation is returned to the previous step G13.

In the case that the magnifying-glass operation button 13c is depressed ("NO" in step G15), the control unit 21 judges as to whether or not the display unit 12 provided on the upper surface of the appliance main body 11 is moved along the vertical direction, namely along the Z-axis direction with respect to the display screen based upon a sensor signal derived from the sensor 18 build in the appliance main body 11 (step G17). When the movement of the appliance main body 11 along the Z-axis direction is detected ("YES" of step G17), similar to the step A14, the control unit 21 executes an integral calculation process operation as to a voltage signal (digital signal) outputted from the 3-axial acceleration sensor 18, so that a move amount of the display unit 12 along the Z-axis direction is calculated (step G18). Then, the control unit 21 adds the move amount along the Z-axis direction, which is presently detected, to the vertical direction terminal move distance Y in order that the vertical direction terminal move distance Y is updated (step G19).

In this seventh embodiment, at this stage, a display magnification changing rate "ΔRMAG" defined in response to the vertical direction terminal move distance Y is set (step G20). In other words, when this move distance Y is cleared (Y=0), the display magnification changing ratio ΔRMAG is set which is defined from a position where the magnifying-glass operation button 13c is depressed and which is defined in response to the move distance (=Y) of the appliance main body 11 along the Z-axis direction.

Then, in the next step G21, this display magnification changing ratio ΔRMAG is added to the display magnification RMAG, so that the display magnification is updated. As a result, the display magnification may be gradually enlarged/compressed at such a speed in response to the vertical direction terminal move distance Y.

For example, assuming now that the magnifying-glass operation button 13c is depressed, the appliance main body 11 is moved by a certain distance along the Z-axis direction while this magnifying-glass operation button 13c is continuously depressed, and then, the appliance main body 11 is stopped at the lowermost point while the magnifying-glass operation button 13c is continuously depressed, the display magnification RMAG in the display unit 12 after the appliance main body 11 is stopped is continuously enlarged (otherwise, compressed) at a constant display magnification changing ratio ΔRMAG in response to such a distance between the lower most point and the position where the magnifying-glass operation button 13c is depressed. After the magnifying-glass operation button 13c has been released, the display content of the display unit 12 is newly fixed in such a display magnification when the magnifying-glass operation button 13c is released.

Next, the control unit 12 enlarges/compresses this image data based upon the updated display magnification to change the display size. In this case, the control unit 21 firstly executes such a process operation that, as indicated in FIG. 6, an entire image is expanded to the display memory area 25b (step G22). Then, the control unit 21 cuts out an image portion to be displayed on the screen of the display unit 12 from this entire image in response to the display magnification value (step G23), and then, executes the enlarging/compressing process operation in response to the display magnification value (step G24 to step G26). Then, the control unit 21 displays an image (step G27), and further, displays the present display magnification in response to a request (step G28). Since these process operations defined from the step G22 to G28 are similar to the process operations defined from the step A16 to the step A22 in FIG. 7, which have been described in detail in the first embodiment of the present invention, descriptions thereof are omitted in this seventh embodiment.

It should also be noted that in this seventh embodiment, as to an upper limit and a lower limit of the display magnification, for instance, a range of predetermined display magnification values is previously set. If a present display magnification value is reached to this display magnification value, then it may be prohibited that the display magnification RMAG is updated by exceeding this display magnification rate range. This judging process operation may be realized by such a method. That is, for example, the control unit 21 judges as to whether or not the display magnification RMAG exceeds the above-described predetermined display magnification range after the step G21. In the case that this display magnification RMAG exceeds the display magnification range, this display magnification RMAG is corrected to such a limit value of the previously-determined display magnification range.

It should also be noted that in this seventh embodiment, in the next step G21, the display magnification changing ratio ΔRMAG is added to the display magnification RMAG, so that the display magnification is updated. Alternatively, the present invention may be modified as follows; That is, the display magnification RMAG may be multiplied by the display magnification changing ratio ΔRMAG so as to produce new display magnification "RMAG." In such an alternative case, for example, when the appliance main body 11 is moved in order to perform a compressing operation, the display content is compressed to 80% obtained just before this movement.

MODIFICATIONS

It should also be understood that the present invention is not limited only to the portable telephones 10 and 100, but may be applied to all of such portable type electronic appliances having display units capable of displaying thereon data, for instance, PDA (personal Digital Assistants), mobile PCs (personal Computers), digital cameras, portable type viewers, and so on. In particular, when the present invention is applied to such an electronic appliance as a digital camera and a portable telephone equipped with a camera, such an operation may be alternatively realized which is similar to a digital zooming function (namely, zoom-in/zoom-out function), since a main body (namely, display unit mounted on this main body) is directly moved. Also, even if the above-described digital camera is designed so as to photograph not only a still image, but also a moving picture, the present invention may be apparently applied to such a digital camera.

In summary, the present invention is not limited only to the above-described various embodiments, but may be modified, changed, and substituted without departing from the technical scope and spirit of the present invention. Furthermore, since various stages of the present invention are contained in the above-described various embodiments, various sorts of inventive ideas may be conceived by properly combining a plurality of disclosed structural elements with each other. For instance, even when several structural elements are deleted from all of the structural elements described in the embodiments, the above-described problem may be solved, and in such a case that the above-explained effects can be achieved, an arrangement from which this structural element has been deleted may be conceived as the invention.

Also, the methods described in the above-described various embodiments may be written into various sorts of recording media as a computer-executable program, and then these recording media may be applied to various types of apparatus. These recording media may be realized in the form of, for instance, magnetic disks (flexible disks, hard disks etc.), optical disks (CD-ROM, DVD etc.), semiconductor memories. Alternatively, this computer-executable program may be transferred by way of such a transfer medium as a network so as to be applied to various sorts of apparatus. A computer which realizes this apparatus reads either the program recorded on the recording medium or the program transferred via the transfer medium, and since operations are controlled in accordance with this read program, the computer executes the above-explained process operations.

Alternatively, in addition to the above-described recording media such as CD-ROM and DVD-ROM, the present invention may be realized by employing various sorts of recording media having large storage capacities which will be developed in near future, which are known from, for example, next-generation optical disks using a blue laser such as Blue-ray Disk (registered trademark) and AOD (Advanced Optical Disc); HD-DVD9 using a red laser; Blue Laser DVD using a blue purple laser, and the like.

What is claimed is:

1. A portable electronic device comprising:
a display unit having a display screen;
a storage unit for storing information which is displayed on the display screen of the display unit;
a move amount detecting unit for detecting a move amount of the display unit in a substantially vertical direction with respect to the display screen; and
a display control unit for causing the information stored in the storage unit to be displayed on the display screen in a manner such that a display size of the information is dynamically changed in response to the move amount of the display unit in the substantially vertical direction detected by the move amount detecting unit;
wherein when the move amount detecting unit detects movement of the display unit in a direction directed from a rear surface of the display screen to a front surface of the display screen, the display control unit enlarges the information at a ratio in accordance with the detected move amount and displays the enlarged information, and
wherein when the move amount detecting unit detects movement of the display unit in a direction directed from the front surface of the display screen to the rear surface of the display screen, the display control unit compresses the information at a ratio in accordance with the detected move amount and displays the compressed information.

2. A portable electronic device comprising:
a display unit having a display screen;
a storage unit for storing information which is displayed on the display screen of the display unit;
a move amount detecting unit for detecting a move amount of the display unit in a substantially vertical direction with respect to the display screen; and
a display control unit for causing the information stored in the storage unit to be displayed on the display screen in a manner such that a display size of the information is dynamically changed in response to the move amount of the display unit in the substantially vertical direction detected by the move amount detecting unit;
wherein when the move amount detecting unit detects movement of the display unit in a direction directed from a rear surface of the display screen to a front surface of the display screen, the display control unit compresses the information at a ratio in accordance with the detected move amount and displays the compressed information, and
wherein when the move amount detecting unit detects movement of the display unit in a direction directed from the front surface of the display screen to the rear surface of the display screen, the display control unit enlarges the information at a ratio in accordance with the detected move amount and displays the enlarged information.

3. A portable electronic device comprising:
a display unit having a display screen;
a storage unit for storing information which is displayed on the display screen of the display unit;
a move amount detecting unit for detecting a move amount of the display unit in a substantially vertical direction with respect to the display screen;
a display control unit for causing the information stored in the storage unit to be displayed on the display screen in a manner such that a display size of the information is dynamically changed in response to the move amount of the display unit in the substantially vertical direction detected by the move amount detecting unit; and
an instruction unit for instructing an initializing display mode;
wherein when the initializing display mode is instructed by the instruction unit, the display control unit returns the display size of the information displayed on the display screen of the display unit back to a predetermined size.

4. A portable electronic device comprising:
a display unit having a display screen;
a storage unit for storing information which is displayed on the display screen of the display unit;
a move amount detecting unit for detecting a move amount of the display unit in a substantially vertical direction with respect to the display screen;
a display control unit for causing the information stored in the storage unit to be displayed on the display screen in a manner such that a display size of the information is dynamically changed in response to the move amount of the display unit in the substantially vertical direction detected by the move amount detecting unit; and
a magnification setting unit for setting a magnification value per a unit move amount;
wherein the display control unit determines a display magnification with respect to the detected move amount of the display screen of the display unit in the substantially vertical direction based upon the magnification value set by the magnification setting unit.

5. A portable electronic device comprising:
a display unit having a display screen;
a storage unit for storing information which is displayed on the display screen of the display unit;
a move amount detecting unit for detecting a move amount of the display unit in a substantially vertical direction with respect to the display screen;
a display control unit for causing the information stored in the storage unit to be displayed on the display screen in a manner such that a display size of the information is dynamically changed in response to the move amount of the display unit in the substantially vertical direction detected by the move amount detecting unit; and
a magnifying-glass mode operation button for controlling a changing process operation of the display size by the display control unit;
wherein the display control unit executes a display control operation for dynamically changing the display size of the information in response to the detected move amount of the display unit in the substantially vertical direction, only when the magnifying glass mode operation button is depressed.

6. A portable electronic device comprising:
a display unit having a display screen;
a storage unit for storing information which is displayed on the display screen of the display unit;
a move amount detecting unit for detecting a move amount of the display unit in a substantially vertical direction with respect to the display screen; and
a display control unit for causing the information stored in the storage unit to be displayed on the display screen in a manner such that a display size of the information is dynamically changed in response to the move amount of the display unit in the substantially vertical direction detected by the move amount detecting unit;
wherein the display control unit controls the display size of the information not to be changed when the detected move amount of the display unit in the substantially vertical direction is smaller than or equal to a predetermined value.

7. A portable electronic device comprising:
a display unit having a display screen;
a storage unit for storing information which is displayed on the display screen of the display unit;
a move amount detecting unit for detecting a move amount of the display unit in a substantially vertical direction with respect to the display screen; and
a display control unit for causing the information stored in the storage unit to be displayed on the display screen in a manner such that a display size of the information is dynamically changed in response to the move amount of the display unit in the substantially vertical direction detected by the move amount detecting unit;
wherein the display control unit controls the display size of the information not to be changed when a move direction of the display unit in the substantially vertical direction is different from a prior move direction of the display unit in the substantially vertical direction.

8. A portable electronic device comprising:
a display unit having a display screen;
a storage unit for storing information which is displayed on the display screen of the display unit;
a move amount detecting unit for detecting a move amount of the display unit in a substantially vertical direction with respect to the display screen; and
a display control unit for causing the information stored in the storage unit to be displayed on the display screen in a manner such that a display size of the information is dynamically changed in response to the move amount of the display unit in the substantially vertical direction detected by the move amount detecting unit;
wherein when the move amount detecting unit detects that the display unit has been moved in the substantially vertical direction over a distance longer than or equal to a predetermined distance, the display control unit changes the display size of information according to a predetermined ratio.

9. The portable electronic device as claimed in claim 8, further comprising:
a magnifying-glass enlarging mode button for instructing an enlarging process operation of the display size; and
a magnifying-glass compressing mode button for instructing a compressing process operation of the display size;
wherein when the move amount detecting unit detects that the display unit has been moved over the distance longer than or equal to the predetermined distance in the substantially vertical direction, and when the magnifying-glass enlarging mode button is depressed, the display control unit enlarges the display size of the information in the predetermined ratio, and
wherein when the move amount detecting unit detects that the display unit has been moved over the distance longer than or equal to the predetermined distance in the substantially vertical direction, and when the magnifying-glass compressing mode button is depressed, the display control unit compresses the display size of the information in the predetermined ratio.

10. The portable electronic device as claimed in claim 8, wherein:
when the move amount detecting unit detects that the display unit has been moved in the substantially vertical direction over the distance longer than or equal to the predetermined distance, the display control unit selectively controls the display size of the information to be changed in accordance with a detected move direction of the display unit.

11. A portable electronic device comprising:
a display unit having a display screen;
a storage unit for storing information which is displayed on a display screen of the display unit;

a first move amount detecting unit for detecting a first move amount of the display unit in a substantially vertical direction with respect to the display screen;

a second move amount detecting unit for detecting a second move amount of the display unit in a substantially horizontal direction with respect to the display screen; and a display control unit for reading a portion displayable on the display screen of the display unit from the information stored in the storage unit to display the read portion, and for dynamically changing a display size of the read portion of the information in response to the first move amount of the display unit in the substantially vertical direction detected by the first move amount detecting unit, and for dynamically changing a display range of the read portion of the information in response to the second move amount of the display unit in the substantially horizontal direction detected by the second move amount detecting unit.

12. The portable electronic device as claimed in claim 11, further comprising:

an instruction unit for instructing an initializing display mode;

wherein when the initializing display mode is instructed by the instruction unit, the display control unit returns the display size of the information displayed on the display screen of the display unit back to a predetermined size, and returns a display range of the information back to a predetermined range.

13. The portable electronic device as claimed in claim 11, wherein:

the display control unit sets a changing speed of the display range in accordance with movement of the display screen of the display unit in the substantially horizontal direction in response to a move distance of the display screen of the display unit in the substantial vertical direction.

14. The portable electronic device as claimed in claim 11, further comprising:

a magnifying-glass mode operation button for controlling a changing process operation of the display size by the display control unit;

wherein the display control unit executes a display control operation for dynamically changing the display size of the information in response to the detected first move amount of the display unit in the substantially vertical direction, only when the magnifying glass mode operation button is depressed; and wherein the display control unit executes a display control operation for dynamically changing the display size of the information in response to the detected second move amount of the display unit in the substantially horizontal direction only when the magnifying glass mode operation button is depressed.

15. The portable electronic device as claimed in claim 11, wherein:

the display control unit controls the display size of the read portion of the information displayed on the display screen of the display unit to be continuously changed when the first move amount detecting unit detects a continuous movement of the display unit in the substantially vertical direction.

* * * * *